United States Patent
Shimomura

(10) Patent No.: US 7,508,563 B2
(45) Date of Patent: Mar. 24, 2009

(54) OPTICAL SCANNING DEVICE AND IMAGE FORMING APPARATUS USING THE SAME

(75) Inventor: Hidekazu Shimomura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/131,456

(22) Filed: Jun. 2, 2008

(65) Prior Publication Data

US 2008/0297871 A1 Dec. 4, 2008

(30) Foreign Application Priority Data

May 31, 2007 (JP) ............................. 2007-144748

(51) Int. Cl.
*G02B 26/08* (2006.01)
*B41J 27/00* (2006.01)

(52) U.S. Cl. .................. 359/204; 359/205; 359/216; 347/232; 347/243; 347/259; 347/261

(58) Field of Classification Search .................. 359/204
See application file for complete search history.

(56) References Cited

U.S. PATENT DOCUMENTS

| | | | |
|---|---|---|---|
| 6,847,473 B2 | 1/2005 | Inagaki | 359/205 |
| 6,992,807 B2 | 1/2006 | Shimomura | 359/207 |
| 2001/0017645 A1* | 8/2001 | Toda | 347/116 |

FOREIGN PATENT DOCUMENTS

| | | |
|---|---|---|
| JP | 2003-287695 | 10/2003 |
| JP | 2004-184655 | 7/2004 |
| JP | 2004-317790 | 11/2004 |

* cited by examiner

*Primary Examiner*—James Phan
(74) *Attorney, Agent, or Firm*—Fitzpatrick, Cella, Harper & Scinto

(57) ABSTRACT

An optical scanning device includes plural light source devices, a deflecting device having deflecting surfaces, an input optical system and a plurality of imaging optical systems, wherein a plurality of scan surfaces are simultaneously scanned by the deflecting device, wherein each of the plurality of imaging optical systems includes at least one transmission type imaging optical element and at least one reflection optical element, wherein each of at least two light beams scanningly deflected by the different deflecting surfaces of the deflecting device passes through the at least one transmission type imaging optical element constituting the imaging optical system and is thereafter reflected by the at least one reflection optical element and, subsequently, it passes again through the transmission type imaging optical element, and wherein, after passing again through the transmission type imaging optical element, the at least two light beams scanningly deflected by the different deflection surfaces of the deflecting means intersect with each other within a sub-scan section.

8 Claims, 15 Drawing Sheets

OPTICAL SCANNING DEVICE AND IMAGE FORMING APPARATUS USING THE SAME

FIELD OF THE INVENTION AND RELATED ART

This invention relates to an optical scanning device and an image forming apparatus using the same. The present invention is suitably usable in an image forming apparatus such as a laser beam printer (LBP), a digital copying machine or a multifunction printer, for example, having an electrophotographic process.

Conventionally, optical scanning devices are used in laser beam printers (LBP), digital copying machines or multifunction printers. In such optical scanning devices, a light flux (light beam) having been optically modulated in accordance with an imagewise signal and emitted from light source means, is periodically deflected by an optical deflector which comprises a rotary polygonal mirror (polygon mirror).

The thus deflected light beam is then focused into a spot-shape upon a photosensitive recording medium (photosensitive drum) by means of an imaging optical system having an fθ characteristic. By this light beam, the surface of the photosensitive drum is optically scanned and image recording is performed thereon.

FIG. 19 is a schematic diagram of a main portion of a conventional optical scanning device.

In FIG. 19, a single or a plurality of divergent light beams emitted from light source means 1 are converted into a parallel light beam by means of a collimator lens 3 and, after passing through a stop 2 which restricts the light beam, the light beam is incident on a cylindrical lens 4 having a predetermined refracting power only in the sub-scan direction.

Within the main-scan section, the parallel light beam incident on the cylindrical lens 4 goes out of the lens while being unchanged.

Within the sub-scan section, the light beam is converged and imaged as a line image on the deflecting surface (reflection surface) 5a of an optical deflector 5 which comprises a polygon mirror.

Then, the light beam scanningly deflected deflect by the deflecting surface 5a of the optical deflector 5 is directed by an imaging lens 6 having an fθ characteristic, onto the photosensitive drum surface 8 as a surface to be scanned.

By rotating the optical deflector 5 in the direction of an arrow A, the photosensitive drum surface 8 is optically scanned with a single or a plurality of light beams in the direction of an arrow B (main-scan direction), whereby imagewise information is recorded thereon.

Here, denoted at 18 in FIG. 19 is a mirror for synchronism detection, and denoted at 19 is a sensor for synchronism detection.

On the other hand, with regard to color image forming apparatuses, an optical scanning device in which an optical deflector (polygon mirror) is shared by a plurality of light beams has conventionally been proposed, in an attempt to making the overall system compact (see Patent Documents Nos. 1 and 2 below)

FIG. 20 is a sectional view (sub-scan sectional view) of a main portion of an optical scanning device, in the sub-scan direction, as disclosed in Patent Document No. 1.

In the optical scanning device 12 shown in FIG. 20, two optical scanning units 12A and 12B are disposed in parallel within a single optics box 11, by which as for, images of total four colors of yellow (Y), magenta (M), cyan (C) and black (Bk) are formed.

In the optical scanning units 12A and 12B in FIG. 20, light beams are incident on different deflecting surfaces of an optical deflector 5 which comprises a polygon mirror having four surfaces. After passing through a transmission type imaging lens 61 having a power (refracting power) mainly in the main-scan direction, the light path is turned around by 90 degrees by means of a reflecting mirror 7.

The light beam reflected by the reflecting mirror 7 passes through an imaging lens 62 having a power mainly in the sub-scan direction, and thereafter it is directed to a photosensitive drum 8 which is the surface to be scanned.

FIG. 21 is a sectional view (sub-scan sectional view) of a main portion of an optical scanning device, in the sub-scan direction, as disclosed in Patent Document No. 2.

The optical scanning device 12 in FIG. 21 is accommodated in a single optical box 11.

In FIG. 21, light beams are incident on a single optical deflector 5 comprising a four-surface polygon mirror, in four directions from the above, below, left and right as viewed in the drawing.

In the optical scanning device 12 shown in FIG. 21, the imaging lenses 61A and 61B having a power mainly in the main-scan direction are shared by light beams of the vertical direction (sub-scan direction), and imaging lenses 62A, 62B, 62C and 62D having a power mainly in the sub-scan direction are disposed in association with respective light beams.

In FIG. 21, in order that a single optical deflector 5 is shared by light beams in the vertical direction (sub-scan direction), within the sub-scan section these light beams are incident from obliquely above and obliquely below relative to the section perpendicular to the deflecting surface.

Furthermore, a single reflecting mirror 71 is used as an optical system for directing the light beam to outwardly disposed photosensitive drums 8A and 8D among the four photosensitive drum 8A, 8B, 8C and 8D. On the other hand, two reflecting mirrors 72 and 73 are used as an optical system for directing the light beam to inwardly disposed photosensitive drums 8B and 8C.

[Patent Documents]

No. 1: Japanese Laid-Open Patent Application No. 2004-184655

No. 2: Japanese Laid-Open Patent Application No. 2004-317790

No. 3: Japanese Laid-Open Patent Application No. 2003-287695

In FIG. 20 and FIG. 21, if the distance in the vertical direction from the surface S of the optics box 11 accommodating the optical scanning device 12 to the scanned surface (photosensitive drum surface) 8 is denoted by H, the distance H should preferably be made as short as possible.

By the way, in the optical scanning device of Patent Document No. 1, in H=164 mm. In the optical scanning device of Patent Document No. 2, H=105 mm.

Furthermore, in Patent Document No. 2, since the light beams are separated vertically (in sub-scan direction) with respect to a normal to the optical deflector, the light beams are incident from oblique directions in the sub-scan section relative to the deflecting surface of the optical deflector.

The optical scanning device wherein a light beam is incident obliquely in the sub-scan section as described above is designed while taking into account the pitch unevenness due to the shift decentration of the deflecting surface.

Generally, the following methods may be used to make the optical scanning device more compact:

(1) The optical distance from the optical deflector to the scanned surface may be shortened; or (2) The light path may be folded by using a mirror to meet the configuration of the main assembly of the image forming apparatus.

Here, the term "optical distance" refers to the "distance (optical path length) in the state in which the light path is developed".

In the method (1), generally there may be an optical system in which the number of the surfaces of the polygon mirror as an optical deflector is reduced to expand the scan field angle, thereby to shorten the light path.

It is depth of focus in the main-scan direction at the image end portion that raises a problem in such an optical system. If the angle defined between the plane perpendicular to the scanned surface and the principal ray of the light beam incident on the image end portion, within main-scan section, is denoted by $\alpha$ (deg), the depth of focus decreases in proportion to $\cos^3\alpha$.

Generally if the angle $\alpha$ becomes larger than 40 degrees, it becomes difficult to control the variation of focus due to a manufacturing error of the imaging lens or variation of the distance between the optical scanning device and the photosensitive drum, within the range of the depth of focus.

Furthermore, if a multi-beam laser source is used in such optical system, a large quantity of jitter will be produced in the main-scan direction because of oblique incidence of plural light beams upon the photosensitive member drum surface.

Furthermore, reducing the number of the surfaces of the polygon mirror as an optical deflector is disadvantageous from the viewpoint of speedup.

On the other hand, there may be a method in which the optical path length is shortened by changing the light beam incident on the optical deflector from a parallel light beam to a convergent light beam, to make the system compact.

However, if a light beam having strong convergence is incident on the optical deflector, a large amount of jitter will be produced in the main-scan direction due to the shift decentralization error of the deflecting surface.

Therefore, in an optical scanning device in which a light beam having strong convergence is incident, the finishing precision of the polygon mirror as an optical deflector must be improved, and this makes the production more difficult.

With the methods (2) above, the problem of the depth of focus or the jitter in the main-scan direction as described hereinbefore can be avoided.

However, if the number of mirrors (reflecting mirrors) increases, the overall system would be complicated correspondingly.

Furthermore, image degradation will grow up because of focus deviation due to mirror surface precision or disposition error thereof, or pitch unevenness resulting from the oscillation of the mirror.

Hence, even with this method, it is very difficult to manufacture an optical scanning device which satisfies all the picture quality and the size.

SUMMARY OF THE INVENTION

The present invention provides an optical scanning device and/or an image forming apparatus using the same, by which the whole device can be made compact.

In accordance with an aspect of the present invention, there is provided an optical scanning device, comprising: at least two light source devices; a deflecting device having a plurality of deflecting surfaces; an input optical system configured to direct at least two light beams emitted from said at least two light source devices, onto different deflecting surfaces of said deflecting device; and a plurality of imaging optical systems configured to image the at least two light beams scanningly deflected by the different deflecting surfaces of said deflecting device, upon corresponding scan surfaces to be scanned, respectively; wherein the scan surfaces are simultaneously scanned by said deflecting device; wherein each of said plurality of imaging optical systems includes at least one transmission type imaging optical element and at least one reflection optical element, wherein each of the at least two light beams scanningly deflected by the different deflecting surfaces of said deflecting device passes through the at least one transmission type imaging optical element constituting said imaging optical system and is thereafter reflected by the at least one reflection optical element and, subsequently, it passes again through the transmission type imaging optical element, and wherein, after passing again through the transmission type imaging optical element, the at least two light beams scanningly deflected by the different deflection surfaces of said deflecting means intersect with each other within a sub-scan section.

In one preferred form of this aspect of the present invention, when in the sub-scan section an angle defined between a principal ray of the light beam after first passing through the transmission type imaging optical element and a principal ray of the light beam after being reflected by the at least one reflection optical element but before passing again through the transmission type imaging optical element is denoted by $\psi$ (deg), a condition $$4°<\psi<20°$$

is satisfied.

When a spacing defined within the sub-scan section between a deflecting point as the light beam emitted from said light source device is scanningly deflected by a deflecting surface of said deflecting means and a reflection point on the or one of the reflection optical elements by which the light beam scanningly deflected by said deflecting device is first reflected, is denoted by T (mm), and a spacing defined within the sub-scan section between incidence points of light beams on two adjacent scan surfaces is denoted by D (mm), a condition $$0.35<T/D<0.75$$

may be satisfied.

Each of said imaging optical systems may have only one transmission type imaging optical element.

Within the sub-scan section the principal ray of the light beam incident on the deflecting surface of said deflecting means may be incident perpendicularly to the deflecting surface of said deflecting means.

The or each reflection optical element constituting said imaging optical system may comprise a plane mirror.

In accordance with another aspect of the present invention, there is provided an image forming apparatus, comprising: an optical scanning device as recited in above; a plurality of photosensitive members disposed at the scan surfaces, respectively; a plurality of developing devices each being configured to develop an electrostatic latent image formed on a corresponding photosensitive member with a light beam scanningly deflected by said optical scanning device, to produce a toner image; a plurality of transferring devices each being configured to transfer a developed toner image onto a transfer material; and a fixing device configured to fix the transferred toner image, on the transfer material.

In accordance with one preferred from of this aspect of the present invention, the apparatus further comprises a printer controller configured to convert a color signal supplied from an outside machine into an imagewise data of different colors.

Briefly, in accordance with the present invention, an optical scanning device by which the overall system can be made compact as well as an image forming apparatus having the same are accomplished.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Preferred embodiments of the present invention will now be described with reference to the attached drawings.

Embodiment 1

Figure 1:
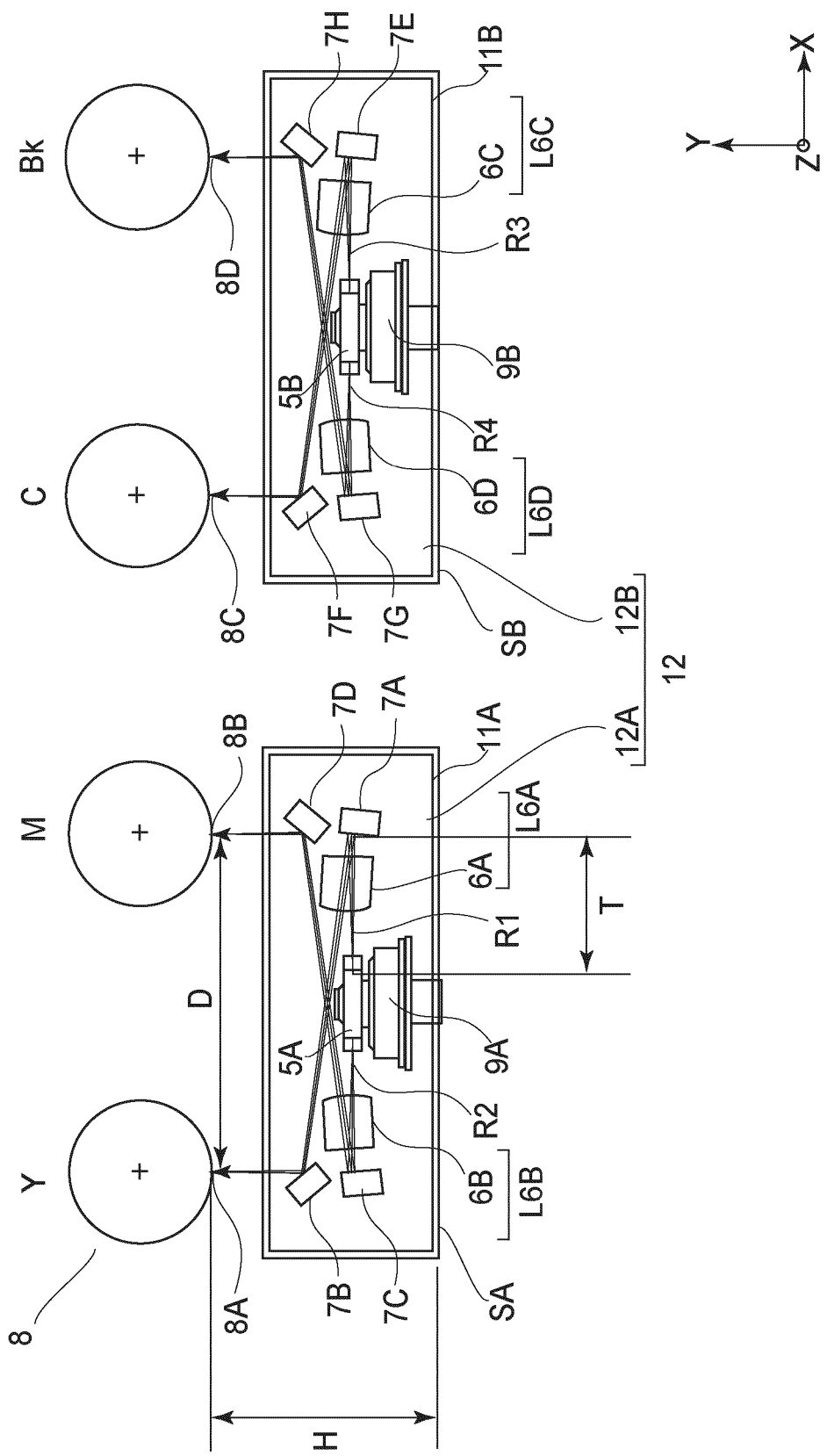
FIG. 1 is a sub-scan sectional view of an optical scanning device according to a first embodiment of the present invention.

FIG. 1 is a sectional view (sub-scan sectional view) in a sub-scan direction of a main portion of an image forming apparatus having an optical scanning device according to a first embodiment of the present invention.

Figure 2:
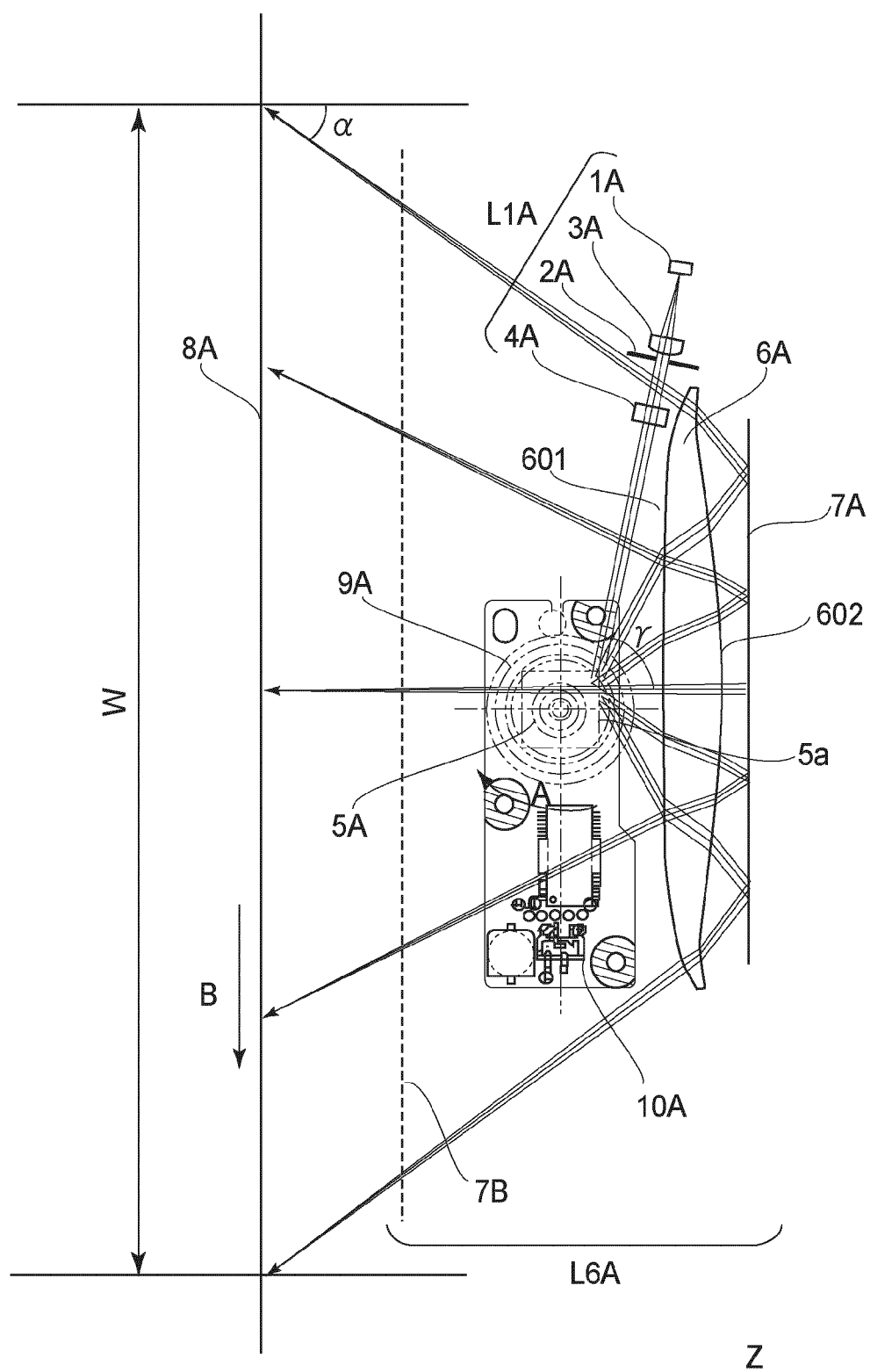
FIG. 2 is a main-scan sectional view of a main portion of the optical scanning device according to the first embodiment of the present invention.

FIG. 2 is a sectional view (main-scan sectional view) in a main-scan direction of a main portion of the first embodiment of the present invention.

In the following description, the term "main-scan direction" (Y direction) refers to a direction which is perpendicular to the rotational axis of deflecting means and the optical axis (X direction) of an imaging optical system (i.e. the direction in which the light beam is scanningly deflected by the deflecting means).

The term "sub-scan direction" (Z direction) refers to a direction which is parallel to the rotational axis of the deflecting means.

The term "main-scan section" refers to a plane which is parallel to the optical axis of the imaging optical system and the main-scan direction.

The term "sub-scan section" refers to a section which is parallel to the optical axis of the imaging optical system and is perpendicular to main-scan section.

Furthermore, in the following description, the upper side (upwardly) refers to in the direction of the rotation axis of the deflecting means, and it is at the photosensitive drum side. The lower side (downwardly) refers to the opposite side (the bottom surface side of the optical scanning unit).

In the image forming apparatus having an optical scanning device 12 of the present embodiment, as shown in FIG. 1, a plurality of optics boxes 11A and 11B having optical scanning units 12A and 12B accommodated therein are disposed in parallel.

With this arrangement, images of total four colors of yellow (Y), magenta (M), cyan (C) and black (Bk) are produced at the same time.

Since the optical scanning units 12A and 12B accommodated in the optics boxes 11A and 11B have the same structure and the same optical function, description will be made mainly on the optical scanning unit 12A housed in the optics box 11A.

Furthermore, those components of the optical scanning unit 12B accommodated in the optics box 11B and corresponding to those of the optical scanning unit 12A housed in the optics box 11A, are denoted with the addition of parentheses.

The optical scanning unit 12A (12B) in the present embodiment comprises two light source devices (not shown) and an optical deflector (polygon mirror) as deflecting means 5A (5B) having a plurality of deflecting surfaces (four surfaces in this example) and doing rotational motion.

Furthermore, it comprises an input optical system (not shown) for directing light beams from two light source devices onto different deflecting surfaces of the optical deflector 5A (5B), respectively.

Furthermore, it comprises imaging optical systems L6A and L6B (L6C and L6D) for imaging two light beams scanningly and simultaneously deflected by different deflecting surfaces of the optical deflector 5A (5B) upon corresponding scan surfaces 8A and 8B (8C and 8D) to be scanned, respectively, the imaging optical systems being provided in association with these light beams, respectively.

The imaging optical systems L6A and L6B (L6C and L6D) comprises imaging optical elements (imaging lenses) 6A and 6B (6C and 6D) and two or more reflection optical elements (mirrors) 7A, 7B, 7C and 7D (7E, 7F, 7G and 7H).

With the rotational motion of the optical deflector 5A (5B), the two scan surfaces 8A and 8B (8C and 8D) are scanned.

In the present embodiment, the deflection light beam R1 (R3) scanningly deflected by the optical deflector 5A (5B) passes through at least one transmission type imaging optical element 6A (6C) constitute the imaging optical element and, subsequently, it is turned around by the reflection optical element 7A (7E).

The deflection light beam R1 (R3) thus turned around then passes again through the transmission type imaging optical element 6A (6C) in a reverse direction along the optical axis direction of the imaging optical system, being opposite to the first-passage direction.

The light beam passed through the imaging optical element 6A (6C) is turned around upwardly by the reflection optical element 7B (7F), and is directed to the photosensitive drum 8A (8C) for Y (C) color, which is a scan surface.

On the other hand, the deflection light beam R2 (R4) scanningly deflected by the deflecting surface of the optical deflector 5A (5B) first passes through the imaging optical element 6B (6D) (first time passage) and, subsequently, it is turned around by the reflection optical element 7C (7G).

Then, again it passes through the imaging optical element 6B (6D) (second time passage) in a reverse direction along the optical axis direction of the imaging optical system, being opposite to the passage direction of the initial (first time) passage.

The light beam passed through the transmission type imaging optical element 6B (6D) is turned around upwardly by the reflection optical element 7D (7H), and it is directed to the photosensitive drum 8B (8D) for M (Bk) color, which is a scan surface.

In the present embodiment, as described above, the two deflection light beams R1 and R2 (R3 and R4) simultaneously deflected by the different deflecting surfaces of the optical deflector 5A (5B) pass again through the imaging optical elements 6A and 6B (6C and 6D).

Then, after that, the two deflection light beams R1 and R2 (R3 and R4) intersect with each other in a space which is in the rotational axis direction of the optical deflector 5A (5B) and which is spaced apart from the deflecting surface.

Namely, in this embodiment, within the sub-scan section the deflection light beams R1 and R2 (R3 and R4) intersect with each other at a position above the optical deflector 5A (5B), and these are directed to the photosensitive drums which are at a side of the optical deflector 5A (5B) opposite to the imaging optical element.

With this structure, the distance from the photosensitive drum 8A or 8B (8C or 8D) to an adjacent optical scanning unit 12A (12B) and optics box 11A (11B) can be shortened.

Hence, the overall system can be made compact.

In the present embodiment, the transmission type imaging optical elements 6A and 6B (6C and 6D) through which the deflection light beams R1 and R2 (R3 and R4) pass twice each is comprised of a single piece of imaging lens.

Furthermore, the reflection optical elements 7A, 7B, 7C and 7D (7E, 7F, 7G and 7H) of the imaging optical systems L6A and L6B (L6C and L6D) are all constituted by a plane mirror.

It should be noted that, although in the present embodiment within the sub-scan section the deflection light beam R1 and the deflection light beam R2 (deflection light beam R3 and deflection light beam R4) intersect with each other at a position above the optical deflector 5A (5B), depending on the unit-construction of the main assembly of the color image forming apparatus to be described below, the intersection may be made at a position below the optical deflector 5A (5B) which makes pivotal motion.

In this embodiment, if the distance defined in the sub-scan section vertically from the bottom face SA (SB) of the optics box 11A (11B) to the scan surface (photosensitive drum surface 8A or 8B (8C or 8D) is denoted by H, then H=48 mm.

Figure 21:
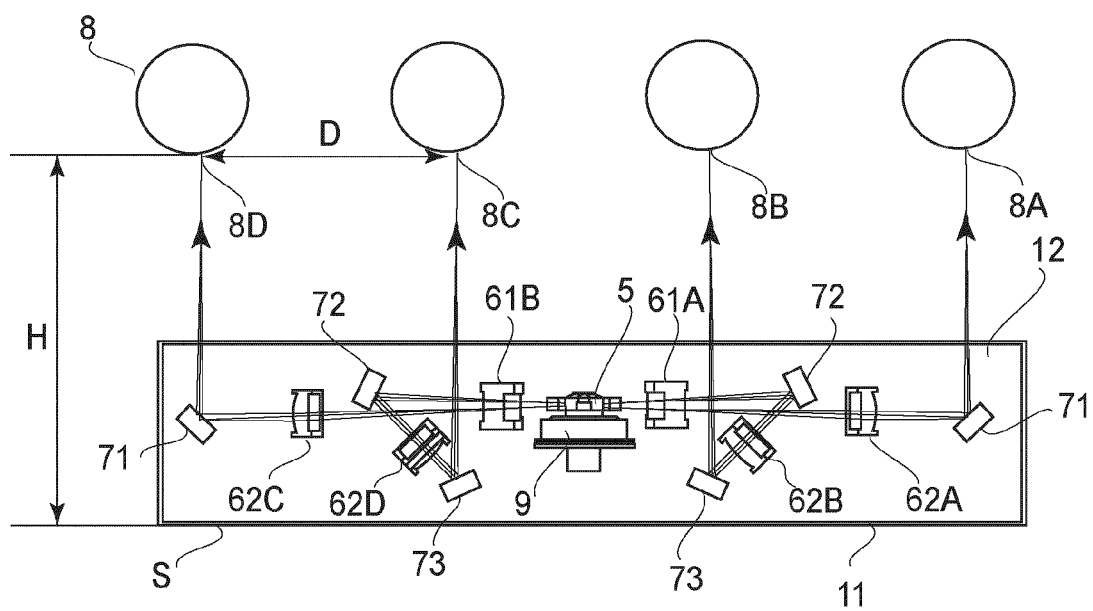
FIG. 21 is a sub-scan sectional view of a conventional optical scanning device.

This is just a half size as compared with the conventional optical scanning device (H=105 mm) illustrated in FIG. 21, despite that the same four-surface polygon mirror is used.

In the present embodiment, the point where the light beam emitted from the light source means is deflected by the deflecting surface of the optical deflector 5A (5B) is taken as a deflection point.

Also, the spacing which is defined within the sub-scan section between this deflection point and the reflection point of the plane mirror 7A or 7C (7E or 7G) which is one of the mirrors by which the light beam deflected by the optical deflector 5A (5B) is first reflected, is denoted by T (mm).

Furthermore, the spacing between incidence points of light of two adjacent scan surfaces 8A and 8B (8C and 8D) is denoted by D (mm).

Then, the following condition is satisfied:

$$0.35 < T/D < 0.75 \tag{1}$$

If the lower limit of conditional expression (1) is exceeded, the plane mirror 7A or 7C (7E or 7G) comes too close to the optical deflector 5A (5B) and the degree of freedom for the disposition of the imaging lens 6A or 6B (6C or 6D) is lowered. As a result, undesirably it becomes difficult to design the imaging lens, satisfying the field curvature correction and fθ characteristic.

If the upper limit of conditional expression (1) is exceeded, the adjoining plane mirrors 7A and 7G come too close to each other, and the shape of the optics box may undesirably become complicated.

The spacing T and the spacing D in the present embodiment and T=28.5 mm and D=70 mm. When these values are applied to conditional expression (1), it follows that:

$$T/D = 0.41$$

and this satisfies conditional expression (1).

In the present embodiment, conditional expression (1) may more preferably be set as follows.

$$0.37 < T/D < 0.70 \tag{1a}$$

Next, the features of the first embodiment will be explained with reference to FIG. 2.

In FIG. 2, among the imaging optical systems (scanning optical systems) corresponding to four colors of Y, M, C and Bk illustrated in FIG. 1, only one imaging optical system corresponding to one color is illustrated selectively. In FIG. 2, only the imaging optical system corresponding for Y color is chosen and illustrated.

Figure 3:
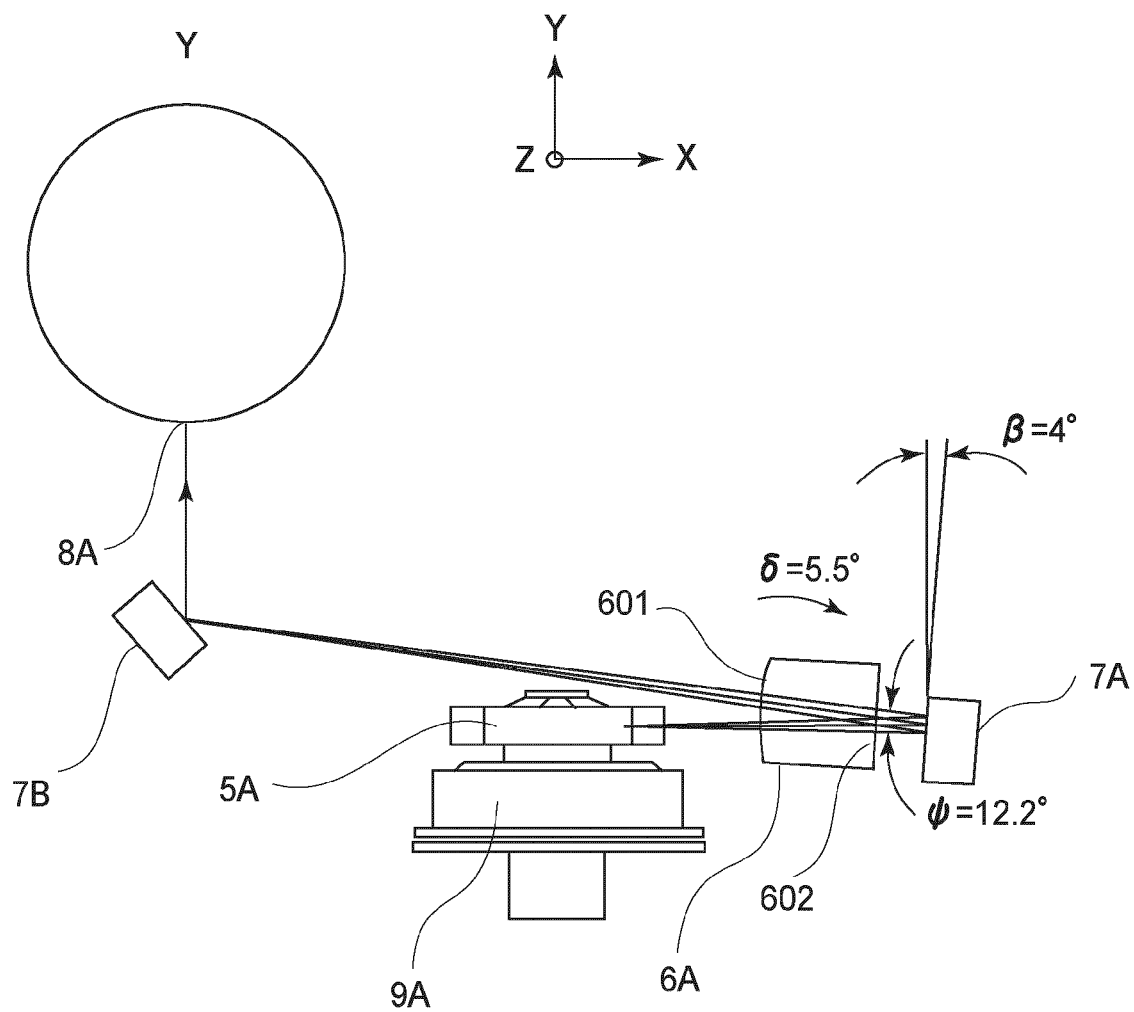
FIG. 3 is a sub-scan sectional and enlarged view of the optical scanning device according to the first embodiment of the present invention.

FIG. 3 is a sub-scan sectional view of a portion of FIG. 1, illustrating details of the arrangement of the optical system.

In FIG. 3, a portion is chosen to illustrate the arrangement of the optical system corresponding to Y color.

It should be noted that the structure and optical function of the optical systems for the other colors M, C and Bk are essentially the same as the optical system for the Y color.

In FIGS. 2 and 3, like numerals are assigned to components corresponding to those of FIG. 1.

In FIGS. 2 and 3, denoted at 1A is a light source device which comprises a semiconductor laser.

Denoted at 3A is a condenser lens (collimator lens) which serves to convert a divergent light beam emitted from the light source means 1A into a convergent light beam.

It should be noted that the condenser lens 3A may not convert the incident light beam into a convergent light beam, but it may convert the same into a parallel light beam or a divergent light beam.

Denoted at 2A is an aperture stop which serves to restrict the passage of the light beam to shape the beam shape thereof.

Denoted at 4A is a cylindrical lens having a predetermined power only in the sub-scan section (sub-scan direction). It functions to image the light beam passed through the aperture stop 2A as a line image in sub-scan section, upon the deflecting surface (reflection surface) 5a of the optical deflector 5A.

It should be noted that the condenser lens 3A and the cylindrical lens 4A may be integrally constituted into one piece of optical element (anamorphic lens).

The optical elements such as condenser lens 3A, aperture stop 2A and cylindrical lens 4A are components of an input optical system (condensing optical system) L1A.

Denoted at 5A is an optical deflector (polygon mirror) as the deflecting means, and it comprises a four-surface structure having a circumscribed circle radius 10 mm, having been conventionally used.

The optical deflector 5A is rotationally movable. It is rotated by a motor 9A at a constant speed in the direction of an arrow A in the drawing, to thereby scan the scan surface 8A in the direction of an arrow B (main-scan direction).

Denoted at L6A is an imaging optical system which comprises a single piece of imaging lens (plastic lens) 6A as an imaging optical element having an fθ characteristic and two pieces of mirrors 7A and 7B as reflection optical elements.

Here, with regard to the folding of the light ray by the mirror 7B, for better understanding, the light path is illustrated as being optically extended.

The imaging optical element may include a dioptric element and a diffractive optical element. In the present embodiment, it is constituted by all dioptric elements.

The mirrors 7A and 7B of the present embodiment are comprised of a plane mirror having no power with respect to both of the main-scan direction and the sub-scan direction.

The imaging optical system L6A may comprise a plurality of transmission type imaging optical elements. Furthermore, it may include a reflection optical element having a power (refracting power).

However, constituting all the reflection optical elements by plane mirrors as in the present embodiment will be advantageous from the standpoint of manufacturing.

The imaging optical system L6A functions to image as a spot the light beam based on the imagewise information and scanningly deflected by the rotationally moving optical deflector 5A, upon the photosensitive drum surface 8A as the scan surface, within the main-scan section (main-scan direction).

Furthermore, within the sub-scan section, the deflecting surface 5a of the rotationally moving optical deflector 5A and the photosensitive member drum surface 8A are placed in an optically conjugate relationship, by which surface tilt correction is carried out.

Generally, in the case of optical deflectors with a plurality of deflecting surfaces such as a polygon mirror, since each deflection surface has a different the tilt angle in the sub-scan direction, usually a surface-tilt correcting optical system is introduced.

In the present embodiment, the divergent light beam emitted from the semiconductor laser 1A is converted into a convergent light beam by the condenser lens 3A. Then, the light beam (light quantity) is restricted by the aperture stop 2A, and it is incident on the cylindrical lens 4A.

Within the main-scan section, the convergent light beam incident on the cylindrical lens 4A goes out of it while being unchanged thereby, and then it is incident on the deflecting surface 5a of the optical deflector 5A.

Here, within the main-scan section the light beam incident on the deflecting surface 5a is so incident thereon that the angle γ defined between the optical axis of the imaging lens 6A and the principal ray of the light beam satisfies a relation γ=78 degrees.

Furthermore, within the sub-scan section, the light beam is further converged and it is imaged as a line image (line image elongating in the main-scan direction) on the deflecting surface 5a of the rotationally moving optical deflector 5A.

Here, the principal ray of the light beam from the input optical system L1A is perpendicularly incident on the deflecting surface 5a of the optical deflector 5A in the sub-scan section, and the light beam is focused on the deflecting surface 5a.

Namely, the principal ray is incident for a direction perpendicular to the rotation axis of the optical deflector 5A.

In the main-scan section, the light beam (deflection light beam) incident on the deflecting surface 5a is being incident at an angle γ=78 degrees as described above. In the sub-scan section, on the other hand, it is incident from a direction perpendicular to the deflecting surface 5a.

Because of this perpendicular light incidence to the deflecting surface 5a, theoretically, any pitch irregularity due to the shift decentration of the deflecting surface 5a does not occur.

Then, the light beam scanningly deflected by the deflecting surface 5a of the optical deflector 5A passes (first time passage) through the imaging lens 6A, and is reflected by the plane mirror 7A. Subsequently, the light beam is again incident on the imaging lens 6A in a reverse direction along the optical axis direction of the imaging optical system with respect to the first-time incidence, and it again passes therethrough (second time passage).

Then, the light beam passed through the imaging lens 6A is reflected again by the plane mirror 7B and is imaged in the shape of spot on the photosensitive material drum surface 8A.

By this, image recording is carried out on the photosensitive drum surface 8A as a recording medium.

In the present embodiment as described above, after the light beam scanningly deflected by the deflecting surface 5a of the optical deflector 5A first passes through the imaging lens 6A, it is turned around by the plane mirror 7A and again passes through the imaging lens 6A from a reverse direction along the optical axis direction of the imaging optical system, with respect to the first-time incidence direction.

By using such structure in this embodiment, reduction in size of the overall system is accomplished.

When in the present embodiment the light beam from the light source means 1A passes through the imaging lens 6A twice, if in the sub-scan section the angle defined between the principal ray of the light beam after passing the lens first time and the principal ray of the light beam before it passes the lens again (second time passage) is denoted by ψ (deg), the following condition is satisfied.

$$4° < \psi < 20° \quad (2)$$

If the lower limit of conditional expression (2) is exceeded, the light beam reflected by the plane mirror 7A and the rotation axis of the optical deflector 5A may interfere with each other, and this is not preferable.

If on the other hand the upper limit of conditional expression (2) is exceeded, the optical scanning device (optics box 11A) itself may become large in the sub-scan direction, and this is not preferable since it doesn't meet compactification.

Furthermore, if the upper limit of conditional expression (2) is exceeded, the oblique incidence angle of the light beam incident on the imaging lens 6A becomes too large. This makes it very difficult to reduce the spot rotation due to twist of the wavefront aberration to be described below or the scan line curve, and it is not preferable.

The angle ψ in the present embodiment is ψ=12.2 degrees, and this satisfies conditional expression (2).

It should be noted here that, in the present embodiment, more preferably the above conditional expression (2) had better be set as follows.

$$8° < \psi < 16° \quad (2a)$$

In the present embodiment, as shown in FIG. 3, the plane mirror 7A is disposed with a tilt β=4 deg. in the sub-scan direction relative to the rotational axis of the optical deflector 5A.

With this arrangement, it is assured that the light beam reflected by the plane mirror 7A can reach the scan surface 8A without interference with the optical deflector 5A.

Next, the lens surface shape and optical disposition in the present embodiment will be shown in Table 1 below.

TABLE 1

| Design Data | | | |
|---|---|---|---|
| Wavelength, Refractive Index | | | |
| Used Wavelength | λ (nm) | | 790 |
| Lens Refractive Index | n | | 1.52781 |

| Disposition | | | |
|---|---|---|---|
| Main-Scan Laser Incidence Angle (deg) | γ | | 78 |
| Sub-Scan Laser Incidence Angle (deg) | | | 0 |
| Light Lay Largest Emission Angle (deg) | | | plus/minus 63.0 |
| Polygon Rotational Center Coordinates (mm) | Y-direction | | −6.281 |
| | X-direction | | −3.480 |
| No. of Polygon Surfaces | | | 4 |
| Polygon Subscribed Circle Diameter (mm) | | | φ20 |
| Effective Scan Width | W | | 220 |
| f-theta coefficient | κ (rad/mm) | | 100 |

| Lens Disposition | | | |
|---|---|---|---|
| | X-direction | Y-direction | Z-direction |
| Lens Light Entrance Surface 601 | 12.900 | 0.200 | 1.350 |
| Lens Light Exit surface 602 | 23.849 | 0.200 | 0.296 |
| Mirror Surface 7 | 28.600 | 0.200 | 0.000 |
| Lens Light Re-Entrance Surface 602 | 23.849 | 0.200 | 0.296 |
| Lens Light Re-Exit Surface 601 | 12.900 | 0.200 | 1.350 |
| Scan Surface 8 | −60.323 | 0.200 | 13.085 |

| Aspherical Data (Main-Scan Direction) | | | Aspherical Data (Sub-Scan Direction) | | |
|---|---|---|---|---|---|
| | Light Entrance Surface 601 | Light Exit Surace 602 | | Light Entrance Surface 601 | Light Exit Surace 602 |
| R | −5.62595E−02 | −1.21939E+02 | r0 | 2.28515E+01 | −4.81612E+01 |
| K | 6.66092E+01 | −2.96142E+01 | D2s | 4.17815E−04 | 1.11894E−03 |
| B4s | 1.77157E−06 | 4.85368E−07 | D4s | −3.45722E−07 | 2.14167E−06 |
| B6s | −9.86072E−10 | −6.26850E−10 | D6s | 2.41949E−10 | −2.01080E−09 |
| B8s | 2.84035E−13 | 2.91649E−13 | D8s | −1.02294E−13 | 1.30162E−12 |
| B10s | −1.65434E−17 | −3.46288E−17 | D10s | 1.78377E−17 | 0.00000E+00 |
| B4e | 1.84666E−06 | 5.49617E−07 | D2e | 7.61077E−04 | 1.13347E−03 |
| B6e | −9.13237E−10 | −5.56051E−10 | D4e | −5.05327E−07 | 5.22825E−08 |
| B8e | 2.49263E−13 | 2.47692E−13 | D6e | 2.38376E−10 | 6.25214E−10 |
| B10e | −1.23109E−17 | −2.80073E−17 | D8e | −8.06165E−14 | −2.84739E−14 |
| | | | D10e | 1.38385E−17 | 0.00000E+00 |

TABLE 1-continued

Design Data

Meridional Function

| | Light Entrance Surface 601 | Light Exit Surace 602 |
|---|---|---|
| A0-A9 | 0 | 0 |
| A10 | 3.66473E−17 | 0 |
| A11 | −2.27229E−19 | 0 |
| A12 | −3.11240E−20 | 0 |
| A13 | 1.33147E−22 | 0 |
| A14 | 9.08013E−24 | 0 |
| A15 | −2.20271E−26 | 0 |
| A16 | −8.74298E−28 | 0 | suffix "s": laser side
suffix "e": opposite-to-laser side

The meridional shape of lens light entrance surface 601 of the imaging lens 6A at the optical deflector 5A side and the lens light exit surface 602 thereof at the plane mirror 7A side, is constituted by an aspherical surface shape which can be depicted by a function up to the tenth order.

If the point of intersection of each lens surface of the imaging lens 6A with the optical axis of the imaging lens 6A is taken as an origin, the optical axis direction is taken as an X axis, an axis orthogonal to the optical axis within the main-scan section is taken as a Y-axis, then the meridional direction that corresponds to the main-scan direction is expressed by the following equation.

$$X = \frac{Y^2/R}{1+(1-(1+K)(Y/R)^2)^{1/2}} + B_4Y^4 + B_6Y^6 + B_8Y^8 + B_{10}Y^{10}$$

where R is the meridional curvature radius, K, $B_4$, $B_6$, $B_8$ and $B_{10}$ are aspherical coefficients.

The aspherical coefficient $B_4$, $B_6$, $B_8$ and $B_{10}$ have different numerical values between those ($B_4s$, $B_6s$, $B_8s$ and $B_{10}s$) at the side where the semiconductor laser 1A of the optical scanning device is disposed and those ($B_4e$, $B_6e$, $B_8e$ and $B_{10}e$) at the side where no semiconductor laser 1A disposed.

This makes it possible to express an asymmetrical shape with respect to the main-scan direction.

Furthermore, the meridional linking the sagittal apexes is curved in accordance with a function which is defined as follows. Here, the origin of Z is taken on the point of intersection between the deflecting surface 5a and the principal ray of the incident light beam.

$$Z = \sum_{i=0}^{n} A_i Y^i$$

Furthermore, the sagittal direction which corresponds to the sub-scan direction is expressed as by the following equation.

$$S = \frac{\frac{Z^2}{Rs^*}}{1+\sqrt{1-\left(\frac{Z}{Rs^*}\right)^2}}$$

where S is the sagittal shape which contains a normal to the meridional in each position in the meridional direction and which is defined within a plane perpendicular to the main-scan section.

Here, the curvature radius (sagittal curvature radius) $Rs^*$ in the sub-scan direction at a position spaced by Y away from the optical axis in the main-scan direction can be expressed by the following equation.

$$Rs^* = Rs \times (1 + D2 \times Y^2 + D4 \times Y^4 + D6 \times Y^6 + D8 \times Y^8 + D10 \times Y^{10})$$

where Rs is the sagittal curvature radius on the optical axis, and D2, D4, D6, D8 and D10 are sagittal variation coefficient.

Similarly to the main-scan shape, the aspherical coefficients D2, D4, D6, D8 and D10 take different numerical values between those (D2s, D4s, D6s, D8s and D10s) at the side where the semiconductor laser 1A is disposed and those (D2e, D4e, D6e, D8e and D10e) at the side where no laser is placed.

This makes it possible to express an asymmetrical shape with respect to the main-scan direction.

In this embodiment, as shown in Table 1, the shape of the lens light entrance surface 601 of the imaging lens 6A at the optical deflector 5A side and the lens light exit surface 602 at the plane mirror 7A side, in the main-scan direction, is determined by the shape based on one function mentioned above.

Since the light beam is refracted by four lens surfaces, the four surfaces (lens light entrance surface 601, lens light exit surface 602, lens light re-entrance surface 602, and lens light re-exit surface 601) are constituted by surfaces defined independently from each other.

In this embodiment, the lens light entrance surface 601 is defined as a first transmission surface, and the lens light exit surface 602 is defined as a second transmission surface. The lens light re-entrance surface 602 is defined as a third transmission surface, and the lens light re-exit surface 601 is defined as a fourth transmission surface.

In that occasion, it may be possible that a large surface step occurs at the lens light exit surface 601 at the optical deflector 5A side and the lens light exit surface 602 at the plane mirror 7A side.

Namely, if the shape in the main-scan direction is optimized individually, a large surface step will be produced.

In consideration of this, in the present embodiment, at least with regard to the main-scan direction a lens shape based on one functions including coefficients is used.

It should be noted that, although in the present embodiment the surface shape is determined by the function based on the definition equation mentioned hereinbefore, this does not limit the scope of the present invention.

In this embodiment, an infrared radiation source having an light beam emission wavelength λ=790 nm is used as light source means (semiconductor laser) 1A.

Furthermore, the proportionality coefficient κ (Y=κθ) between the image height Y and the deflecting reflection angle θ is κ=100 (rad/mm).

Figure 4:
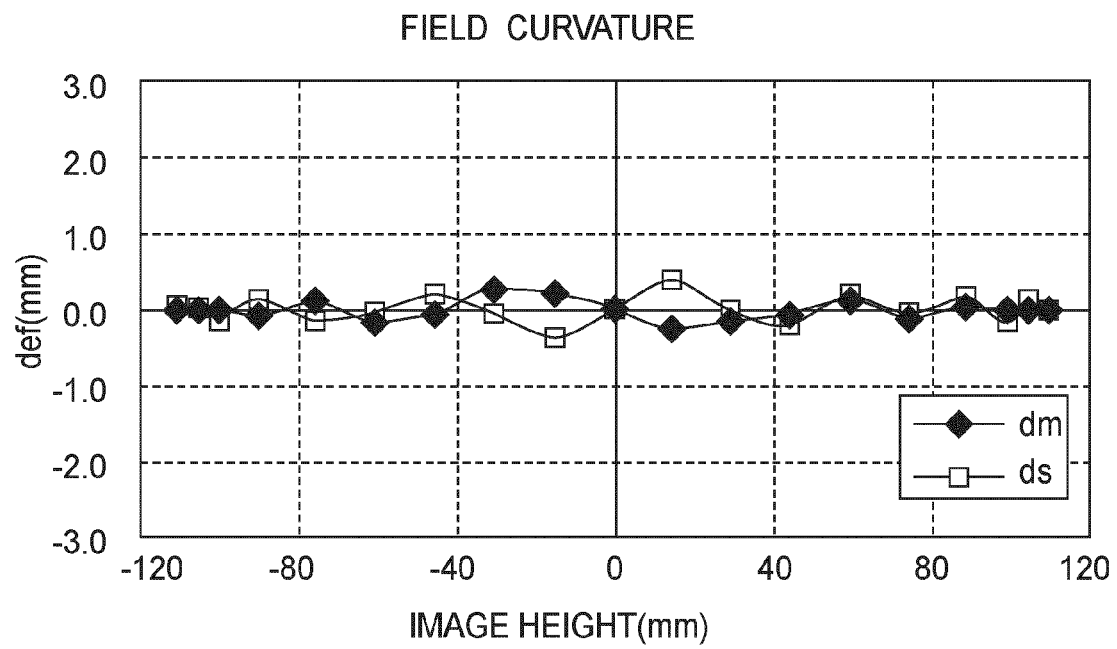
FIG. 4 is a graph illustrating the field curvature of the first embodiment of the present invention.

FIG. 4 is a graph showing the field curvature in the main-scan direction and the sub-scan direction, in the first embodiment of the present invention.

At the effective width (W=220 mm) of the image, the field curvature dm in the main-scan direction is 0.50 mm, and the field curvature in the sub-scan direction is 0.76 mm. It is seen that both of them are well decreased.

Figure 5:
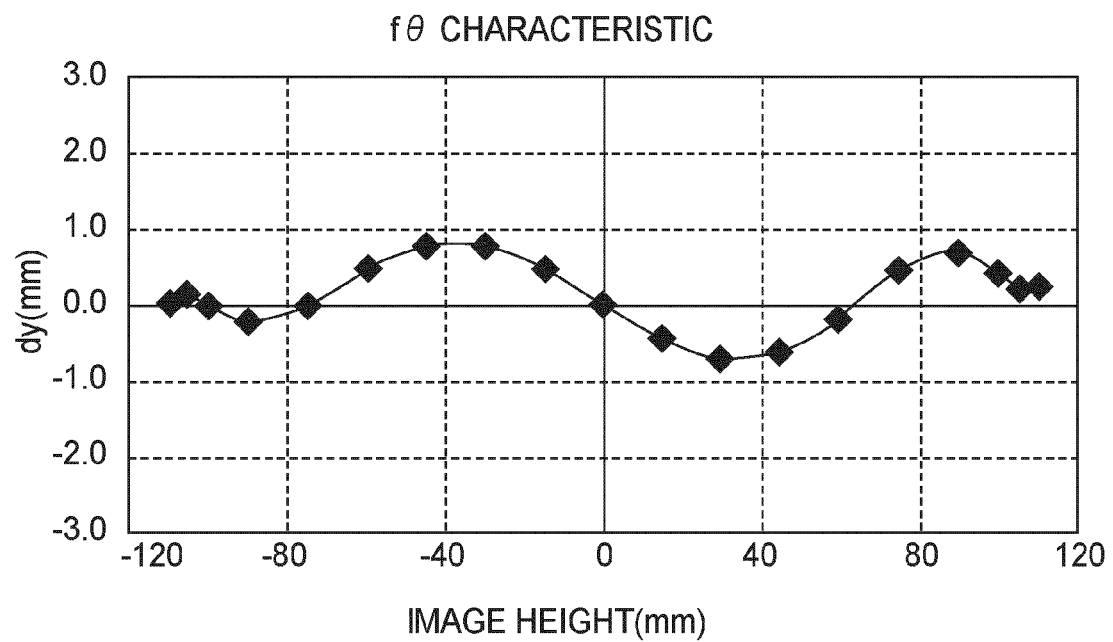
FIG. 5 is a graph illustrating the fθ characteristic of the first embodiment of the present invention.
Figures 6A, 6B, 6C, 6D, 6E:
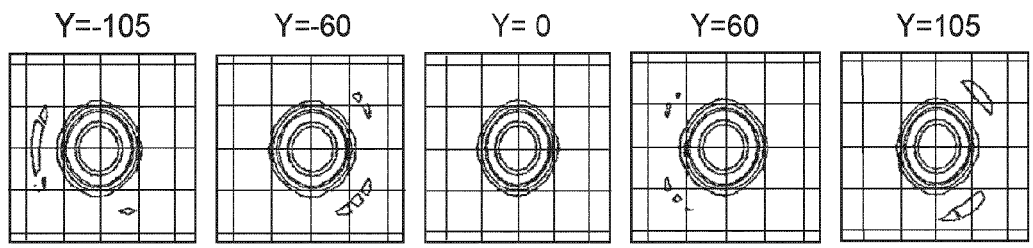
FIGS. 6A-6E are diagrams for explaining the spot profile in the first embodiment of the present invention.

FIG. 5 is a graph illustrating the fθ characteristic of the first embodiment of the present invention.

Specifically, FIG. 5 illustrates the difference obtained by subtracting an ideal image height from the position where light beam actually arrives. There is a maximum deviation of 0.761 mm.

This value is somewhat too large to use, but still the fθ characteristic can be reduced by changing the image clock to meet each image height.

However, if the deviation of the fθ characteristic becomes too large, the spot diameter in the main-scan direction itself changes.

In this embodiment, with regard to the spot diameter which is influential to the depth of the latent image, an fθ characteristic of satisfactory level is provided.

FIGS. 6A-6E are schematic diagrams which illustrate the spot cross-section at respective image heights.

Specifically, FIGS. 6A-6E illustrate the section of spot as sliced by 2%, 5%, 10%, 13.5%, 36.8% and 50% levels of the spot peak light quantity, at respective image heights.

Generally, in optical scanning devices in which a light beam is incident from an oblique direction in the sub-scan section, there will be a phenomenon that a spot rotates due to the twist of the wavefront aberration.

In the present embodiment, the twist of the wavefront aberration is reduced by optimizing the power disposition of the surfaces and the tilt amount and shift amount of the lens as well as the quantity of curve of the meridional in the sub-scan direction.

With regard to the tilt amount of the imaging lens 6A, if the point of intersection between deflecting surface 5a and the principal ray of the incident light beam is taken as an origin, it is tilted by δ=5.5 degrees in the direction of arrow shown in FIG. 3, around a coordinate (12.900, 0.200, 1.350) and in the sub-scan direction.

Furthermore, in the present embodiment, the angle α defined in the main-scan section between the principal ray of the light beam incident at the image end portion and a plane perpendicular to the scan surface 8A, is set as α=35.5 degrees, which is less than 40 degrees. With this arrangement, a sufficient depth of focus in the main-scan direction is assured at the image end portion.

Figure 7:
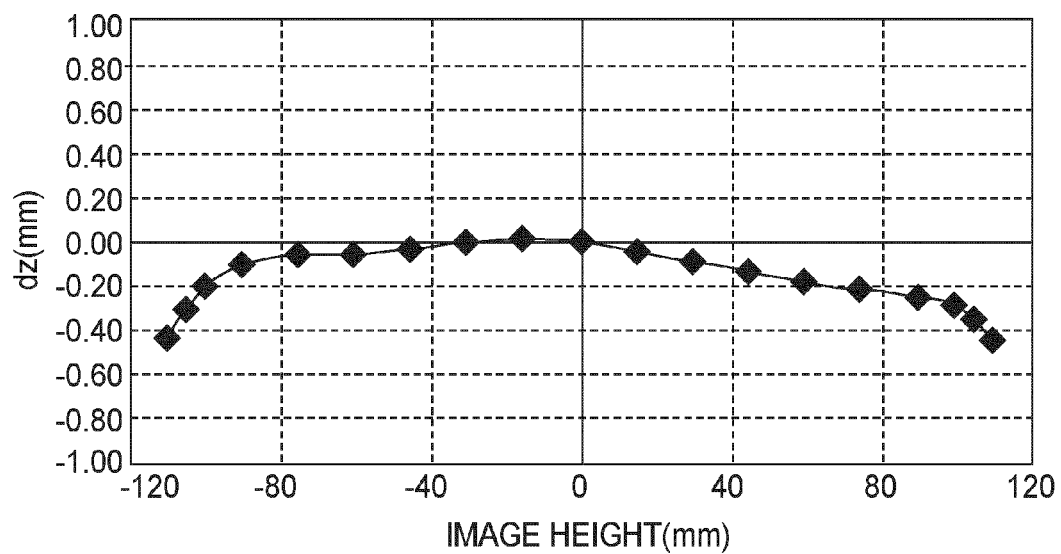
FIG. 7 is a graph illustrating the scan line bend in the first embodiment of the present invention.

FIG. 7 is a graph illustrating the scan line curve which arrives at the scanned surface, in the first embodiment of the present invention.

In the present embodiment, the scan line curve is 0.449 mm which is difficult to use.

Recently, however, even with regard to positional misregistration (scan line tilt and scan line bend) in the sub-scan direction, correction can be done by shifting the image data in the sub-scan direction, for every image height.

Furthermore, the scan line bend can be corrected even by bending an optical component such as a reflecting mirror.

Furthermore, in this embodiment, the light beam from the collimator lens 3A is a convergent light beam. With this arrangement, reduction of the optical path length is accomplished.

The convergence m of the incident light is defined as follows.

$$m = 1 - Sk/f$$

where

Sk: the distance (mm) from the rear principal plane of the imaging optical system to the scanned surface, in the main-scan section; and f: focal length (mm) of the imaging optical system in the main-scan section.

The convergence m in the present embodiment is m=0.248.

Figure 8:
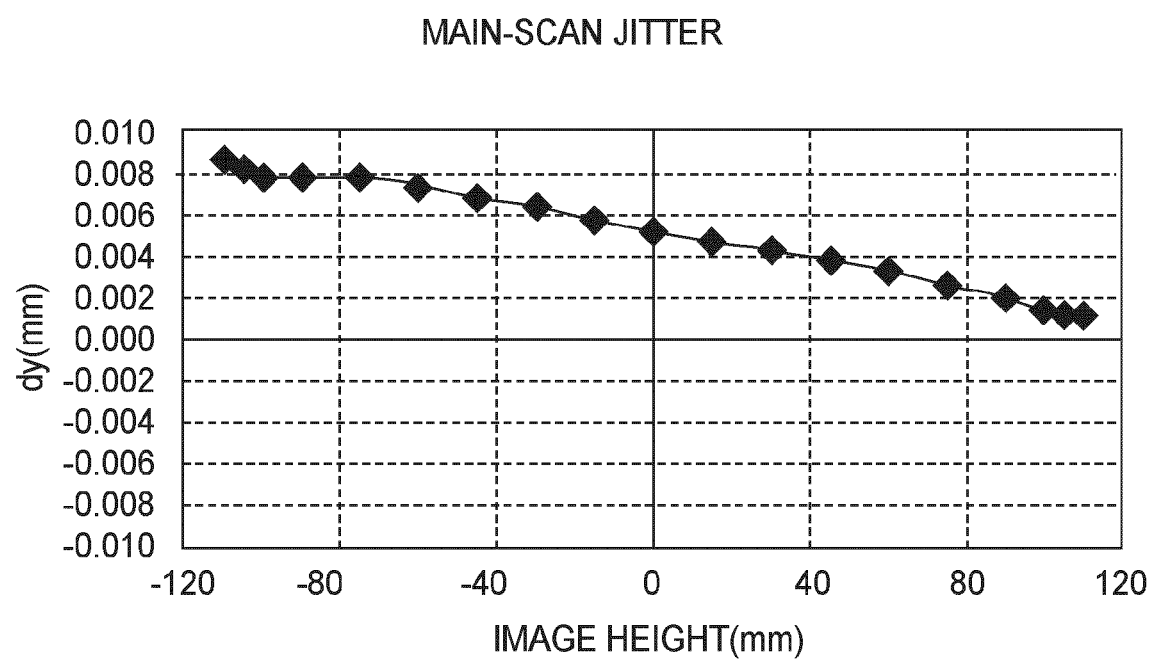
FIG. 8 is a graph illustrating the main-scan jitter in the first embodiment of the present invention.

FIG. 8 is a schematic diagram illustrating the jitter in the main-scan direction when a shift decentration error 10 μm of the deflecting surface is applied.

As shown in FIG. 8, the jitter in the main-scan direction is 8.7 μm at the largest, and hence it has been controlled to a satisfactory level.

On the other hand, recently, resonance type optical deflectors in which a single deflecting surface is reciprocally oscillated have been developed extensively.

When such resonance type optical deflector is used, pitch unevenness due to the surface tilt or main-scan jitter resulting from the surface decentration described hereinbefore can be avoided.

Hence, the advantageous effects of the present embodiment will be enhanced more when used in combination with an oscillation optical deflector of resonance type.

Where a reciprocally oscillating resonance type oscillation optical deflector is used in the present embodiment, one surface (front surface) of one deflecting surface of the optical deflector as well as the other surface (rear surface) thereof may be used as deflecting surfaces, and the light beam may be incident on these two deflecting surfaces.

Then, for example, the light beam scanningly deflected by one deflecting surface (front surface) may be used to scan the scan surface 8A through the imaging optical system L6A, while the light beam scanningly deflected by the other deflecting surface (rear face) may be used to scan the scan surface 8B through the imaging optical system L6B.

Furthermore, since in the reciprocally oscillating resonance type oscillation optical deflector an arbitrary scan surface to be scanned by a light beam is scanned by using a single deflection surface, there occurs no pitch irregularity due to the surface tilt of the deflecting surface.

Hence, there is no necessity of using a surface-tilt correcting optical system makes the deflecting surface and the scanned surface in a conjugate relationship with respect to the sub-scan direction. The light beam may be focused on the deflecting surface in the sub-scan direction or, alternatively, the light beam may not be focused on the deflecting surface in the sub-scan direction.

Namely, a line image elongating in the main-scan direction may be formed on the deflecting surface of the reciprocally oscillating resonance type optical deflector or, alternatively, a line image elongating in the main-scan direction may not be formed on the deflecting surface of the reciprocally oscillating resonance type optical deflector.

When the imaging optical element constituting the imaging optical system L6A is provided by a single piece as described above, the structure can be simplified.

Furthermore, two or more transmission type imaging optical elements may be used to constitute the imaging optical system L6A.

Furthermore, two or more transmission type imaging optical elements through which the light beam passes twice may be used. This makes the aberration correction quite easy.

Embodiment 2

Figure 9:
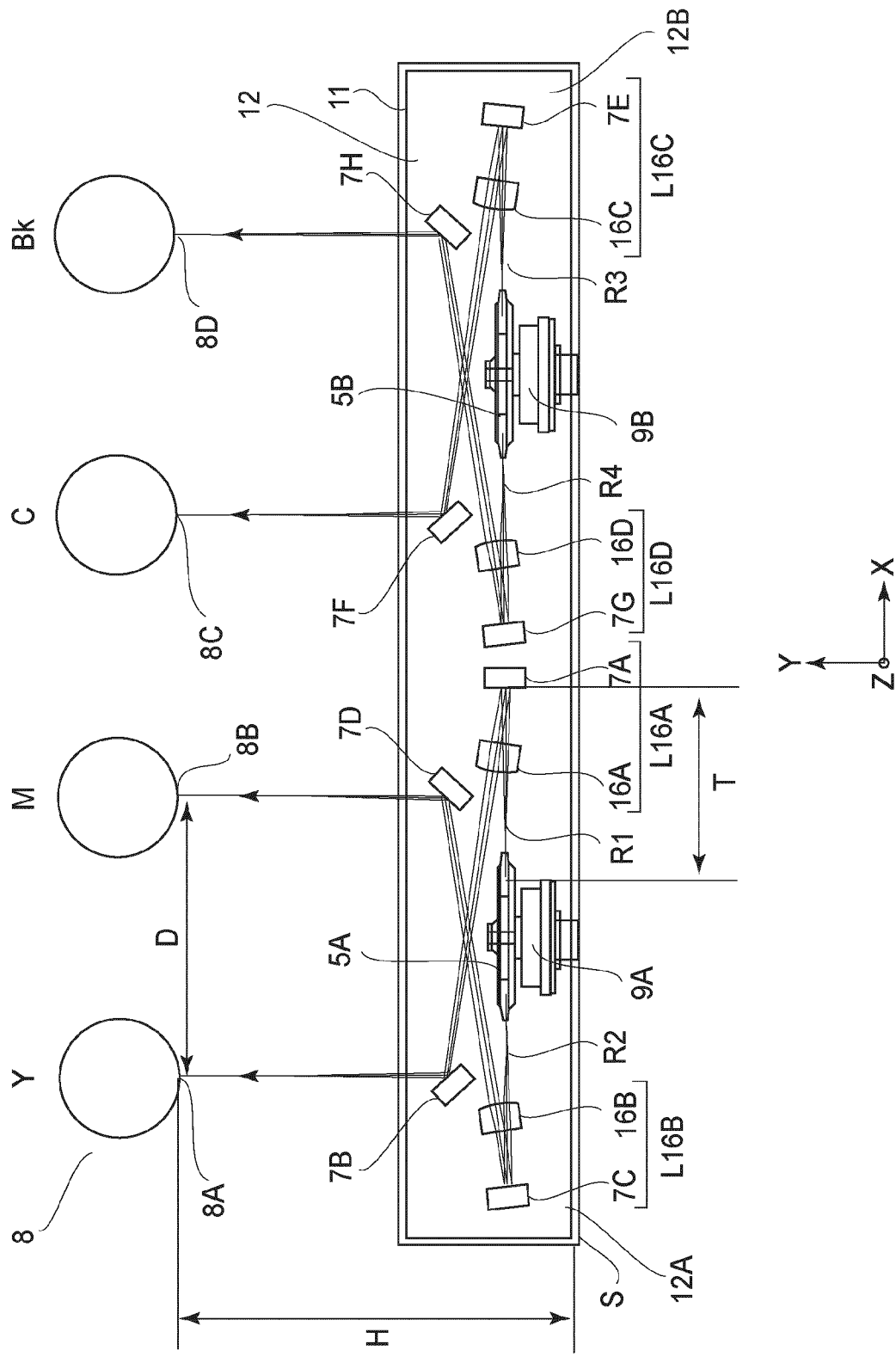
FIG. 9 is sub-scan sectional view of an optical scanning device according to a second embodiment of the present invention.

FIG. 9 is a sectional view (sub-scan sectional view) in the sub-scan direction of a main portion of an image forming apparatus with an optical scanning device according to a second embodiment the present invention.

In FIG. 9, like numerals are assigned to components corresponding to those of FIG. 1.

This embodiment differs from the abovementioned first embodiment in the following points:

(3) Two optical scanning units 12A and 12B are accommodated in a single optics box 11;

(4) A six-surface polygon mirror having a circumscribed circle diameter of 20 mm is sued as the optical deflector 5A (5B); and (5) The surfaces of the imaging lenses 16A and 16B at the optical deflector 5A (5B) side are formed by a shape having different refracting powers, in the sub-scan section, between the position where the light beam deflected by the deflecting surface passes and the position where the light beam turned around by the plane mirror 7A and 7C (7E and 7G) passes.

Other structures and optical functions are similar to the first embodiment and, based on this, similar advantageous effects are obtainable.

More specifically, in FIG. 9, denoted at 11 is an optics box which accommodates two optical scanning units 12A and 12B therein.

In the present embodiment, the deflection light beam R1 (R3) scanningly deflected by the deflecting surface of the optical deflector 5A (5B) first passes through the imaging lens 16A (16C) (first time passage).

Thereafter, the deflection light beam R1 (R3) is turned around by the plane mirror 7A (7E), and subsequently it again passes through the imaging lens 16A (16C) (second time passage) in a reverse direction along the optical axis direction, relative to the direction of the first-time passage.

The light beam passed through the imaging lens 16A (16C) is deflected upwardly by the plane mirror 7B (7F), and it is directed to the photosensitive drum 8A (8C) for Y (C) color, which is the scan surface.

On the other hand, the deflection light beam R2 (R4) scanningly deflected by the deflecting surface of optical deflector 5A (5B) first passes through the imaging lens 16B (16D) and then it is turned around by the plane mirror 7C (7G). Subsequently, the light beam again passes through the imaging lens 16B (16D) from a reverse direction along the optical axis direction of the imaging optical system, with respect to the passage direction of the first-time passage.

The light beam passed through the imaging lens 16B (16D) is upwardly turned around by the plane mirror 7D (7H), and it is directed to the photosensitive drum 8B (8D) for M (Bk) color, which is the scan surface.

In the present embodiment, two deflection light beams R1 and R2 (R3 and R4) scanningly deflected by different deflecting surfaces of the optical deflector 5A (5B) pass again through the imaging optical element 16A and 16B (16C and 16D).

Then, after that, in the sub-scan section the two deflection light beams R1 and R2 (R3 and R4) intersect with each other in a space which is in the rotational axis direction of the optical deflector 5A (5B) and which is spaced apart from the deflecting surface.

In other words, in this embodiment, the deflection light beams R1 and R2 (R3 and R4) intersect with each other above the optical deflector 5A (5B), and these are directed to photosensitive drums which are at the side of the optical deflector 5A (5B) remote from the imaging lens.

With this structure, the distance from the photosensitive drum 8A and 8B (8C and 8D) to the optical scanning unit 12A (12B) and optics box 11A (11B) can be shortened. This makes the overall system very compact.

It should be noted that in the present embodiment the imaging optical element 16A and 16B (16C and 16D) through which the deflection light beam R1 and R2 (R3, R4) passes twice is constituted by a single piece of lens (imaging lens), as in the above-described first embodiment.

Furthermore, the reflection optical element 7A, 7B, 7C and 7D (7E, 7F, 7G and 7H) of the imaging optical system L16A and L16B (L16C and L16D) are all provided by a plane mirror as in the first embodiment.

It should be noted that, although in the present embodiment the deflection light beam R1 and the deflection light beam R2 (deflection light beam R3 and deflection light beam R4) intersect with each other above the optical deflector 5A (5B), depending on the unit-construction of the main assembly of the color image forming apparatus to be described below, these may intersect with each other below the optical deflector 5A (5B).

In this embodiment, a six-surface polygon mirror having a circumscribed circle diameter of 20 mm is sued as the optical deflector.

Generally, in the six-surface polygon mirror, the field angle that can be scanned decreases as compared with a four-surface polygon mirror and, therefore, the distance from the deflective reflecting point to the scan surface has to be lengthened. Thus, it is not suitable from the standpoint of reduction in size.

However, if the scan is made at the same revolution speed, the scan speed can be increased by 1.5 times higher and it is suitable for the speedup.

In this embodiment, the distance in the vertical direction from the bottom face S of the optics box 11 to the scanned surface (photosensitive material drum surface) 8 is H=99 mm, and the size can be made slightly smaller as compared with the optical scanning device of FIG. 21 (H=105 mm) which is a conventional example using a four-surface polygon mirror.

Therefore, in this embodiment, speedup of about 1.5 times is achieved, despite it is an optical scanning device of equal size as the conventional one, using a four-surface polygon mirror.

Furthermore, in the present embodiment, the distance T from the deflection point where the light beam emitted from the light source means is deflected by the deflecting surface of the optical deflector 5A (5B) and the reflecting point of the plane mirror 7A and 7C (7E and 7G) is T=47.6 mm.

Furthermore, the distance D as defined in the sub-scan section between the incidence points of the light beam on two adjacent scan surfaces 8A and 8B (8C and 8D) is D=70 mm.

If these values are applied to conditional expression (1), it follows that:

$T/D=0.68$

This satisfies conditional expression (2).

Figure 10:
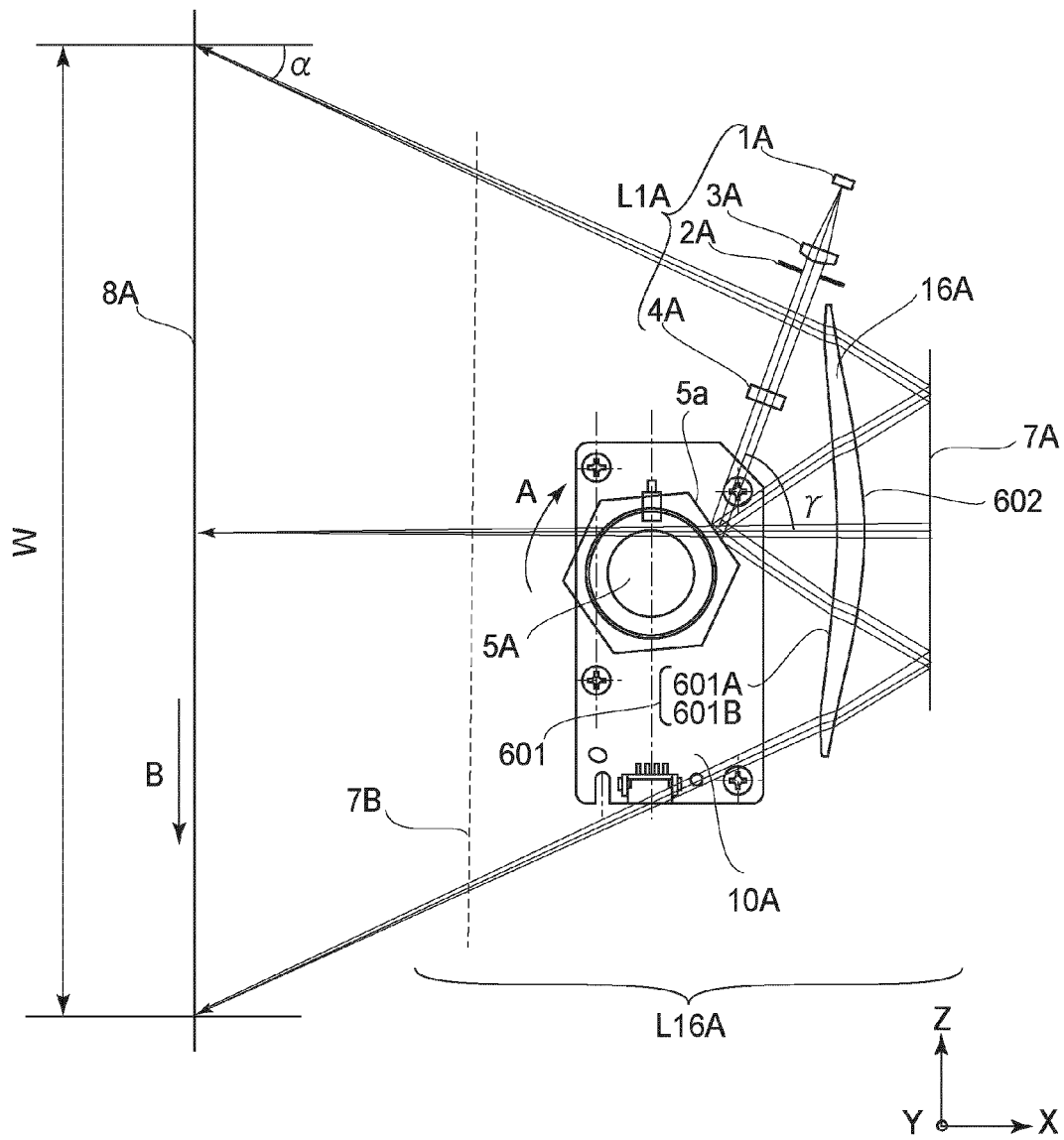
FIG. 10 is a main-scan sectional view of a main portion of the optical scanning device according to the second embodiment of the present invention.

FIG. 10 is a sectional view (main-scan sectional view) in the main-scan direction of a main portion of a second embodiment of the present invention.

In FIG. 10, only one optical system among the scanning optical systems corresponding to four colors Y, M, C and Bk shown in FIG. 9, which corresponds to one color is illustrated.

In FIG. 10, only the optical system corresponding to Y color is chosen and illustrated.

Figure 11:
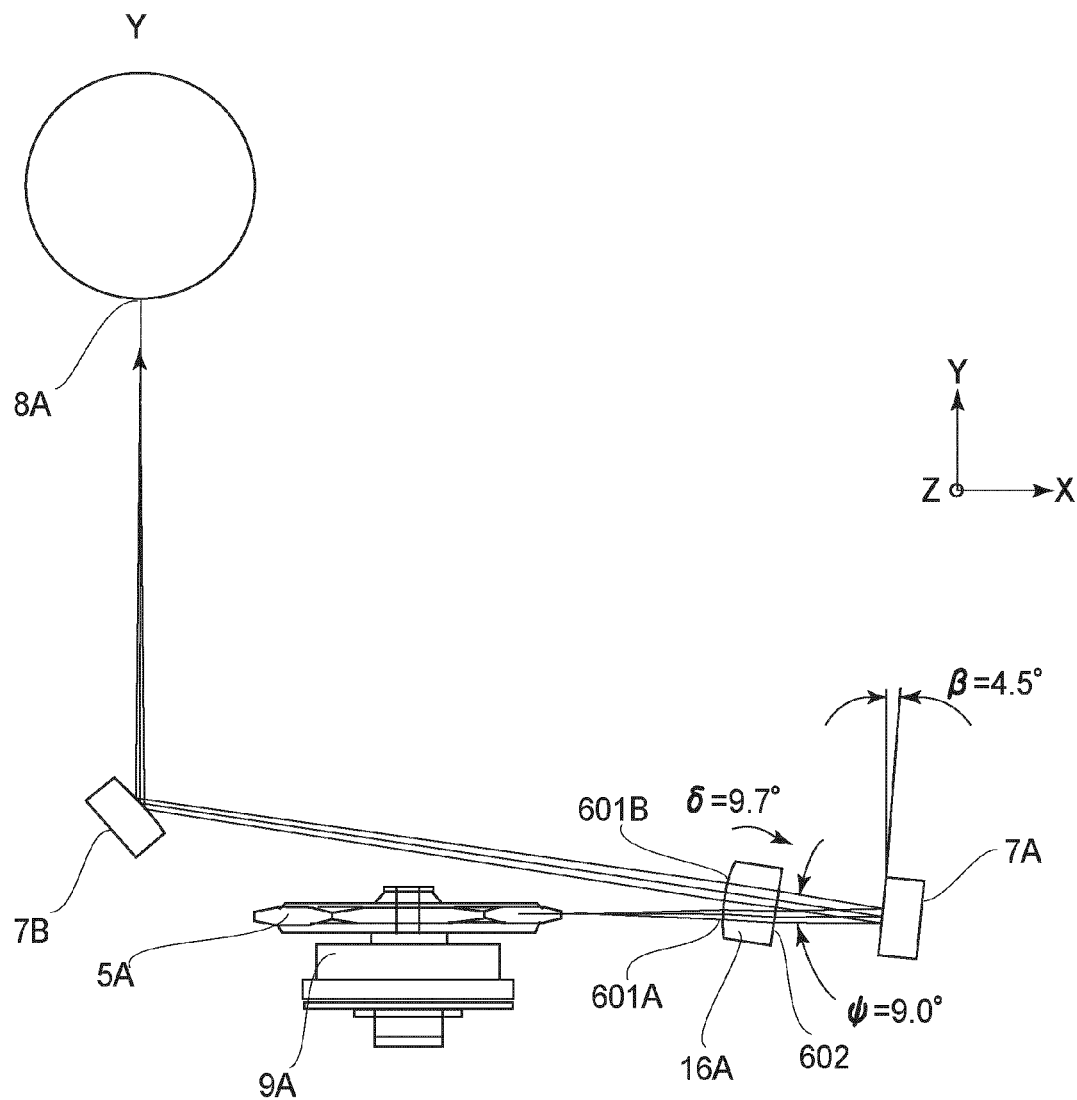
FIG. 11 is a sub-scan sectional and enlarged view of the optical scanning device according to the second embodiment of the present invention.

FIG. 11 is a sub-scan sectional view showing details of an extracted portion of the disposition of the optical system of FIG. 9.

In FIG. 11, only a portion is extracted and illustrated to clearly show the disposition of the optical system corresponding to Y color.

The structure and optical function of the optical systems corresponding to the other colors M, C and Bk are similar to the optical system of Y color.

In FIGS. 10 and 11, like numerals are assigned to components corresponding to those of FIGS. 2 and 3.

Denoted in these drawings at 16A is an imaging lens. The lens surface 601 is divided into a lens light entrance surface 601A and a lens light re-exit surface 601B, such that it comprises a multistage toric surface having different shapes in the sub-scan section, respectively.

In this embodiment, the lens light entrance surface 601A is defined as a first transmission surface, and the lens light exit surface 602 is defined as a second transmission surface. The lens light re-entrance surface 602 is defined as a third transmission surface, and the lens light re-exit surface 601B is defined as a fourth transmission surface.

More specifically, in the present embodiment, the lens surface 601 of the imaging lens 16A at the optical deflector 5A side is formed with a shape having different refracting power within the sub-scan section, differing between the position whereat the light beam turned around by the plane mirror 7A passes and the position whereat the light beam deflected by the deflecting surface passes.

Furthermore, in the present embodiment, the angle $\psi$ defined between the light beam from the imaging lens 16A and the light beam re-entering the imaging lens 16A is set as $\psi=9$ degrees.

This satisfies conditional expression (2) mentioned hereinbefore.

Furthermore, in the present embodiment, the light beam (deflection light beam) to be incident on the deflecting surface 5a is set so that it is incident at angle Y which is defined between the principal ray of that beam and the optical axis of the imaging lens 16A within the main-scan section, wherein Y=70 degrees.

Furthermore, in this embodiment, the plane mirror 7A is disposed with a tilt of $\beta=4.5$ degrees in the sub-scan direction, relative to the rotational axis of the optical deflector 5A, as shown in FIG. 11.

Next, Table 2 and Table 3 show the lens surface shape and optical disposition in this embodiment.

TABLE 2

| Design Data | | | |
|---|---|---|---|
| Wavelength, Refractive Index | | | |
| Used Wavelength | $\lambda$ (nm) | 790 | |
| Lens Refractive Index | n | 1.52781 | |
| Disposition | | | |
| Main-Scan Laser Incidence Angle (deg) | $\gamma$ | 70 | |
| Sub-Scan Laser Incidence Angle (deg) | | 0 | |

TABLE 2-continued

| Design Data | | | |
|---|---|---|---|
| Light Lay Largest Emission Angle (deg) | | | plus/minus 35.0 |
| Polygon Rotational Center Coordinates (mm) | Y-direction | | −14.495 |
| | X-direction | | −9.497 |
| No. of Polygon Surfaces | | | 6 |
| Polygon Subscribed Circle Diameter (mm) | | $\phi$ | 40 |
| Effective Scan Width | W | | 220 |
| f-theta coefficient | $\kappa$ (rad/mm) | | 180 |

| Lens Disposition | | | |
|---|---|---|---|
| | X-direction | Y-direction | Z-direction |
| Lens Light Entrance Surface 601A | 27.150 | 0.300 | 0.000 |
| Lens Light Exit surface 602 | 33.064 | 0.300 | −1.011 |
| Mirror Surface 7 | 47.650 | 0.300 | 0.000 |
| Lens Light Re-Entrance Surface 602 | 33.064 | 0.300 | −1.011 |
| Lens Light Re-Exit Surface 601B | 27.150 | 0.300 | 2.850 |
| Scan Surface 8 | −115.593 | 0.300 | 25.323 |

TABLE 3

| Design Data | | | |
|---|---|---|---|
| | Light Entrance Surface 601A | Light Re-Exit Surace 601B | Light Exit Surface 602 |
| Aspherical Data (Main-Scan Direction) | | | |
| R | −1.65408E+02 | −1.65408E+02 | −1.01848E+02 |
| K | 3.05478E+00 | 3.05478E+00 | −4.04760E+00 |
| B4s | 8.32801E−07 | 8.32801E−07 | 4.64448E−07 |
| B6s | −4.82510E−11 | −4.82510E−11 | −7.25597E−11 |
| B8s | 1.15003E−14 | 1.15003E−14 | 2.45752E−14 |
| B10s | 3.20857E−18 | 3.20857E−18 | −3.01668E−19 |
| B4e | 8.76851E−07 | 8.76851E−07 | 4.78763E−07 |
| B6e | −5.82652E−11 | −5.82652E−11 | −4.40433E−11 |
| B8e | 2.26416E−14 | 2.26416E−14 | 1.71773E−14 |
| B10e | −1.08586E−18 | −1.08586E−18 | −1.56611E−18 |
| Meridional Function | | | |
| A0-A16 | 0 | 0 | 0 |
| Aspherical Data (Sub-Scan Direction) | | | |
| r0 | 9.18069E+01 | 2.48800E+01 | 0.00000E+00 |
| D2s | −2.41507E−03 | 2.86566E−04 | 0.00000E+00 |
| D4s | 3.17696E−06 | −5.75144E−08 | 0.00000E+00 |
| D6s | 0.00000E+00 | 8.04241E−12 | 0.00000E+00 |
| D8s | 0.00000E+00 | −2.09300E−15 | 0.00000E+00 |
| D10s | 0.00000E+00 | −2.70640E−19 | 0.00000E+00 |
| D2e | −3.21295E−03 | 3.00345E−04 | 0.00000E+00 |
| D4e | 6.20953E−06 | −4.63063E−08 | 0.00000E+00 |
| D6e | 0.00000E+00 | 5.77076E−12 | 0.00000E+00 |
| D8e | 0.00000E+00 | −1.27448E−14 | 0.00000E+00 |
| D10e | 0.00000E+00 | 3.17089E−18 | 0.00000E+00 | suffix "s": laser side
suffix "e": opposite-to-laser side

It should be noted that the aspherical surface expression used here is similar to that of the abovementioned first embodiment.

In this embodiment, as shown Table 2 and Table 3, the imaging lens 16A is so shaped that the refracting power in the sub-scan section differs between the lens light entrance surface 601A at the optical deflector 5A side and the lens light re-exit surface 601B.

Since however both the light entrance surface 601A and the lens light re-exit surface 601B have the same shape (same refracting power) in the main-scan section, there is no large surface step at the lens surface.

The shape in the main-scan direction of the lens light exit surface 602 of the imaging lens 16A at the plane mirror 7A side is formed by a shape based on one function as described hereinbefore, like the abovementioned first embodiment.

In this embodiment, like the first embodiment, an infrared radiation source having an emission wavelength λ of lambda=790 nm is used as the light source means 1.

Furthermore, the proportionality coefficient κ (Y=κθ) between the image height Y and the deflecting reflection angle θ is κ=180 (rad/mm).

Figure 12:
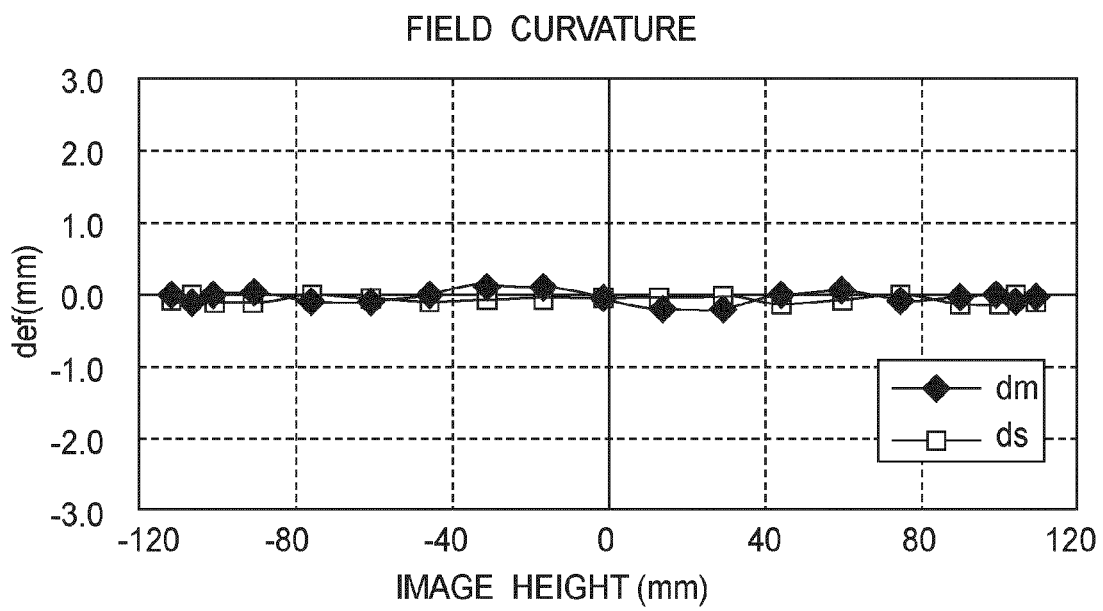
FIG. 12 is a graph illustrating the field curvature of the second embodiment of the present invention.

FIG. 12 is a graph illustrating the field curvature in the main-scan direction and the sub-scan direction, of the second embodiment of the present invention.

At the effective width (W=220 mm) of the image, the field curvature in the main-scan direction is 0.29 mm and the field curvature in the sub-scan direction is 0.07 mm. Thus, it is seen that both of them have been well reduced.

Figure 13:
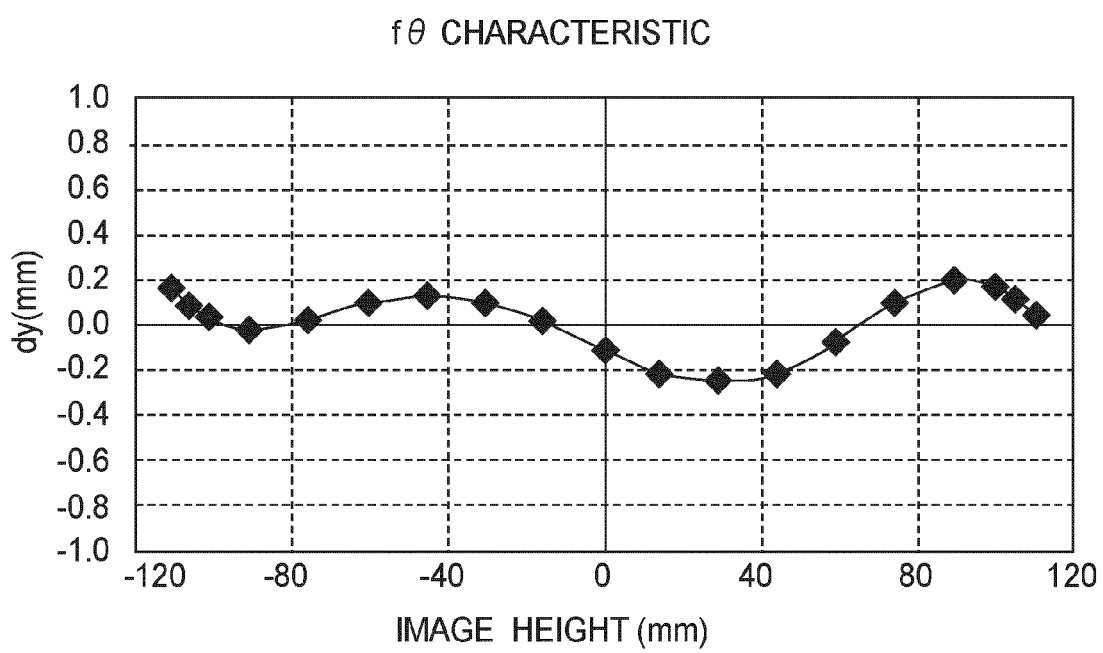
FIG. 13 is a graph illustrating the fθ characteristic of the second embodiment of the present invention.
Figures 14A, 14B, 14C, 14D, 14E:
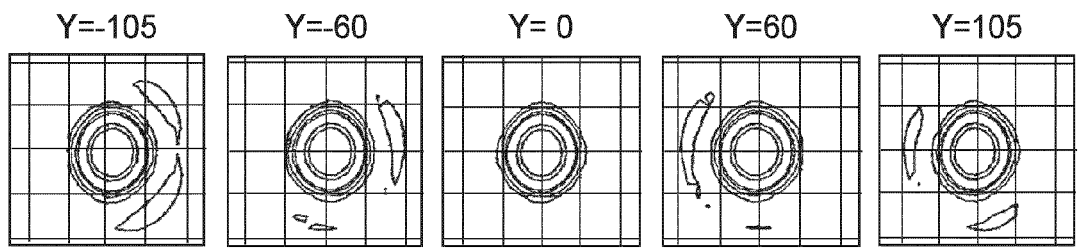
FIGS. 14A-14E are diagrams for explaining the spot profile in the second embodiment of the present invention.

FIG. 13 is a graph illustrating the fθ characteristic of the second embodiment of the present invention.

Specifically, FIG. 13 illustrates the difference obtained by subtracting an ideal image height from the position where light beam actually arrives. There is a maximum deviation of 0.248 mm.

This value is somewhat too large to use, but still the fθ characteristic can be reduced by changing the image clock to meet each image height.

However, if the deviation of the fθ characteristic becomes too large, the spot diameter in the main-scan direction itself changes.

In this embodiment, with regard to the spot diameter which is influential to the depth of the latent image, an fθ characteristic of satisfactory level is provided.

FIGS. 14A-14E are schematic diagrams which illustrate the spot cross-section at respective image heights.

Specifically, FIGS. 14A-14E illustrate the sections of spot as sliced by 2%, 5%, 10%, 13.5%, 36.8% and 50% levels of the spot peak light quantity, at respective image heights.

Generally, in optical scanning devices in which a light beam is incident from an oblique direction in the sub-scan section, there will be a phenomenon that a spot rotates due to the twist of the wavefront aberration.

In the present embodiment, the twist of the wavefront aberration is reduced by optimizing the power disposition of the surfaces of the imaging lens 16A and the tilt amount of the lens.

With regard to the tilt amount of the imaging lens 16A, if the point of intersection between the deflecting surface 5a and the principal ray of the incident light beam is taken as an origin, it is tilted by δ=9.7 degrees in the direction of an arrow shown in FIG. 11, around a coordinate (27.150, 0.300, 0.000) and in the sub-scan direction.

Furthermore, in the present embodiment, the angle α defined in the main-scan section between the principal ray of the light beam incident at the image end portion and a plane perpendicular to the scan surface 8A, is set as α=24.4 degrees, which is less than 40 degrees. With this arrangement, a sufficient depth of focus in the main-scan direction is assured at the image end portion.

Figure 15:
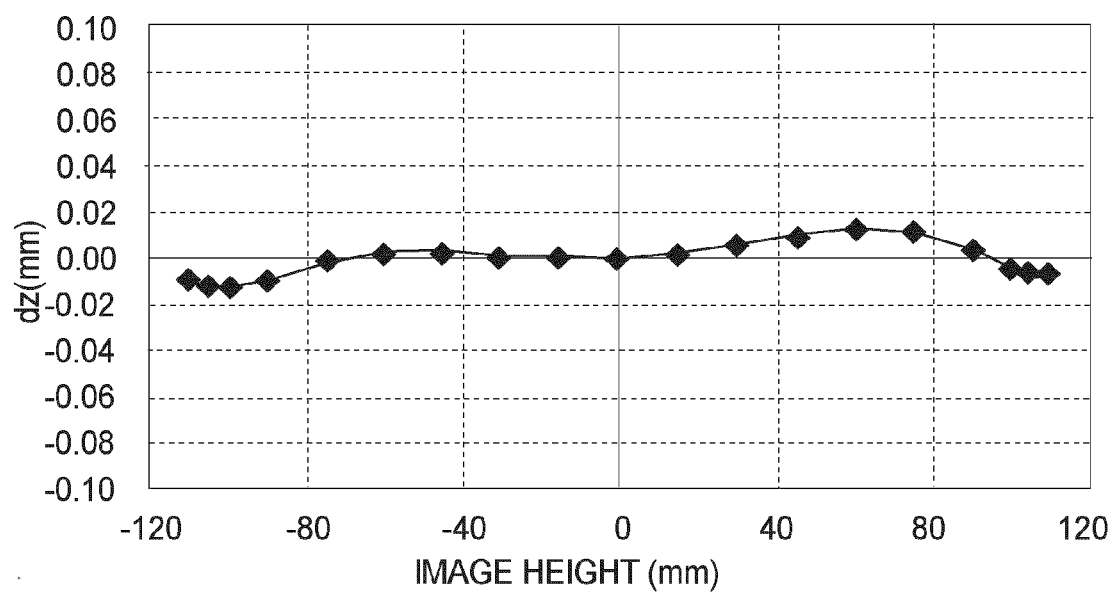
FIG. 15 is a graph illustrating the scan line bend in the second embodiment of the present invention.

FIG. 15 is a graph illustrating the scan line curve which arrives at the scanned surface, in the second embodiment of the present invention.

In the present embodiment, the scan line curve is reduced to a satisfactory level of 0.024 mm.

Furthermore, in this embodiment, the light beam from the collimator lens 3A is a convergent light beam, as in the first embodiment. With this arrangement, reduction of the optical path length is accomplished.

The convergence m in the present embodiment is m=0.239.

Figure 16:
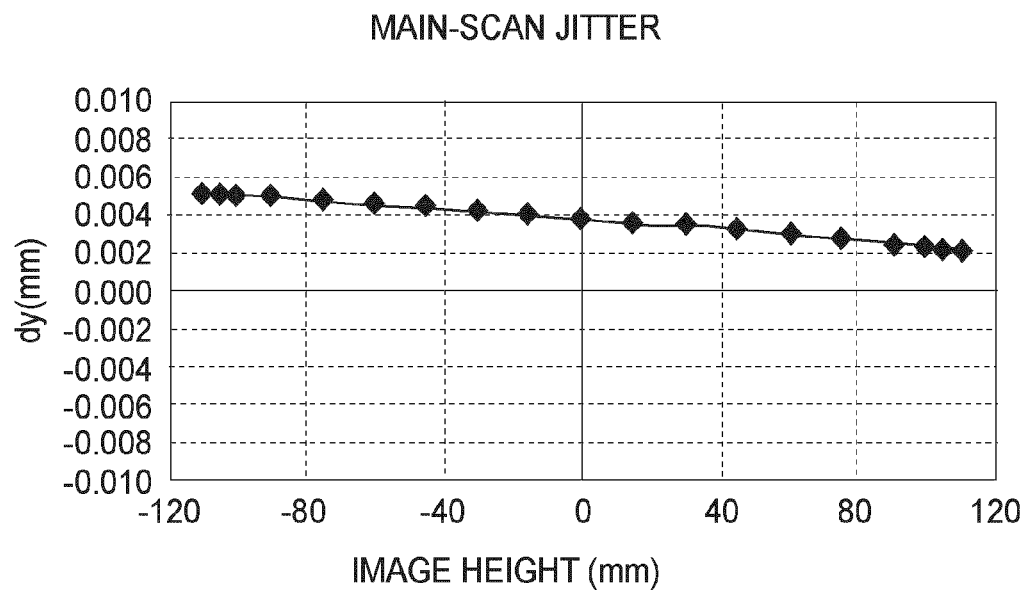
FIG. 16 is a graph illustrating the main-scan jitter in a third embodiment of the present invention.

FIG. 16 is a schematic diagram illustrating the jitter in the main-scan direction when a shift decentration error 10 μm of the deflecting surface is applied.

As shown in FIG. 16, the jitter in the main-scan direction is 5.3 μm at the largest, and hence it has been controlled to a satisfactory level.

Next, the multistage toric surface of the imaging lens 16A used in the present embodiment will be explained.

Figure 17:
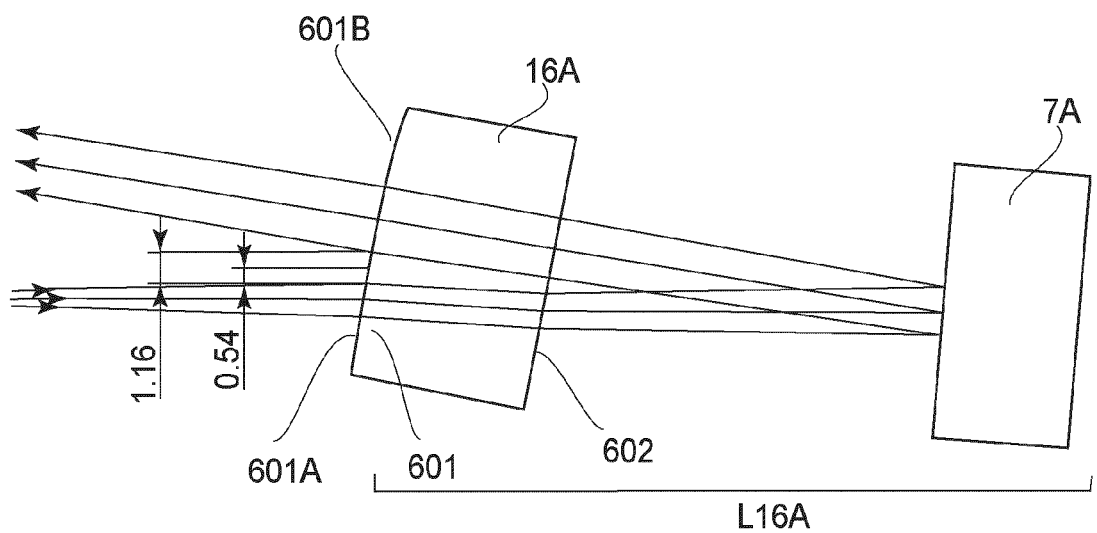
FIG. 17 is a sub-scan sectional view of an imaging lens member of the third embodiment of the present invention.

FIG. 17 is a sub-scan sectional view around the imaging lens 16A. The lens surface 601 at the optical deflector (not shown) 5A side is provided by upper and lower lens light entrance surface 601A and lens light re-exit surface 601B having different shape, as viewed in the drawing.

By distributing more power in the sub-scan section to the lens light re-exit surface 601B side, the magnification of the imaging optical system L16A in the sub-scan section is reduced.

In the present embodiment, the reason why the surface at the optical deflector 5A side, rather than the surface at plane mirror 7A side, is formed by a multistage toric surface is that, as illustrated in FIG. 17, the distance between the light beam deflected by the optical deflector 5A and the light beam turned around by the plane mirror 7A is large.

The distance between the marginal light rays in the sub-scan direction is 1.16 mm, and these are spaced apart from the boundary point of the lens light entrance surface 601A and the lens light re-exits surface 601B by about 0.5 mm, respectively.

Even if any influence of disposition errors of optical components or any characteristic of the lens surface caused during lens molding are taken into consideration, if these are spaced by about 0.5 mm, there would be no problem.

However, with regard to the lens surface at the plane mirror 7A side, since the distance between the marginal light rays is 0.5 mm or less, there would be some difficulty in manufacture to make a multistage toric surface on that lens surface.

In consideration of this, only the lens surface at the optical deflector 5A side is formed into a multistage toric surface, and the design flexibility is improved.

In this embodiment, by using a multistage toric surface for the surface at the optical deflector 5A side, the imaging magnification in the sub-scan section is reduced. As a result of this, the pitch irregularity due to the surface tilt in the sub-scan section of the deflecting surface can be suppressed small.

Furthermore, since the light beam is incident perpendicularly on the deflecting surface, theoretically there occurs no pitch irregularity due to the shift decentration of the deflecting surface.

Therefore, the finishing precision of the polygon mirror which is an optical deflector can be lowered, and this is advantageous from the standpoint of manufacturing.

Embodiment 3

[Color Image Forming Apparatus]

Figure 18:
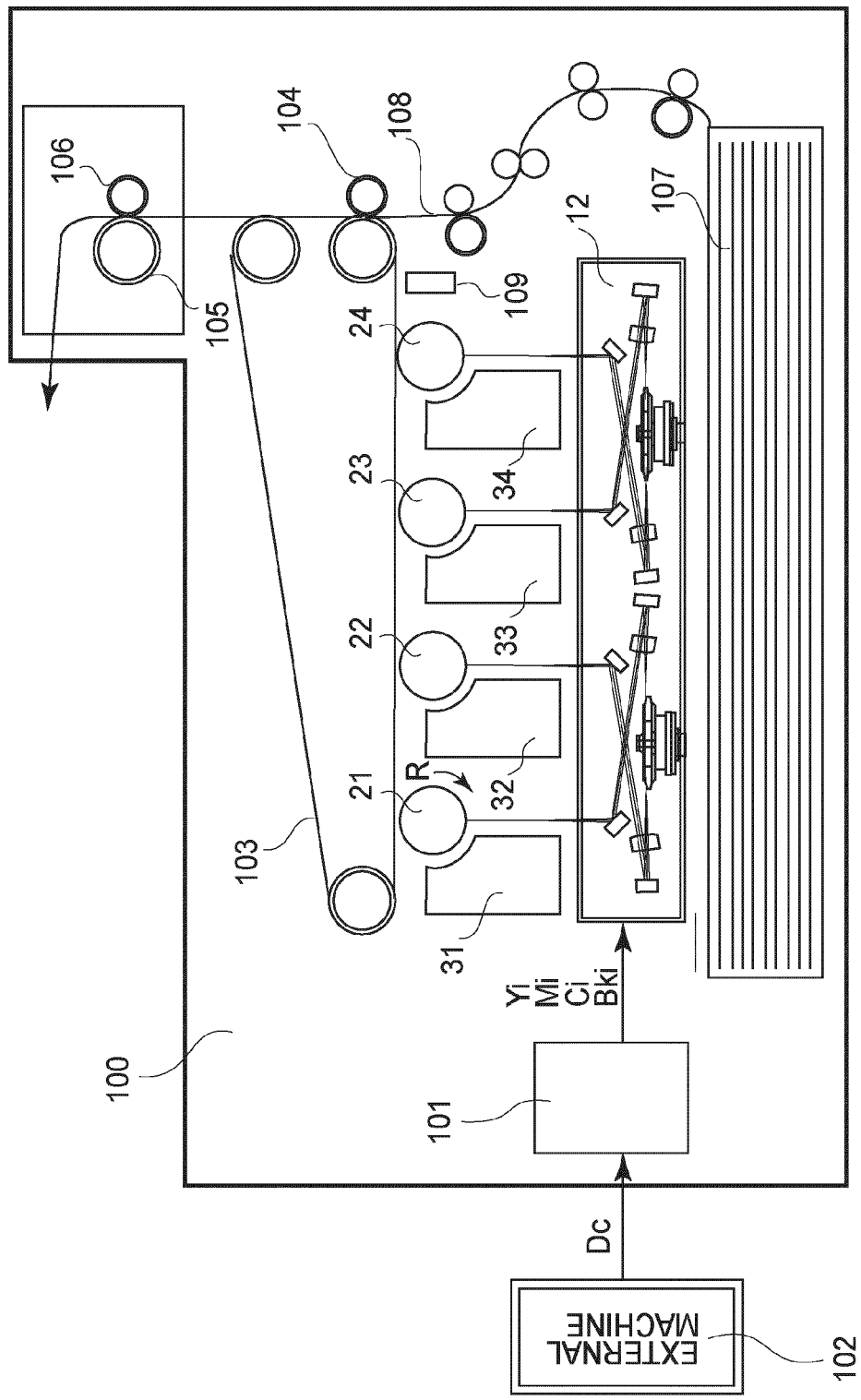
FIG. 18 is a schematic diagram of a main portion of a color image forming apparatus according to an embodiment of the present invention.
Figure 19:
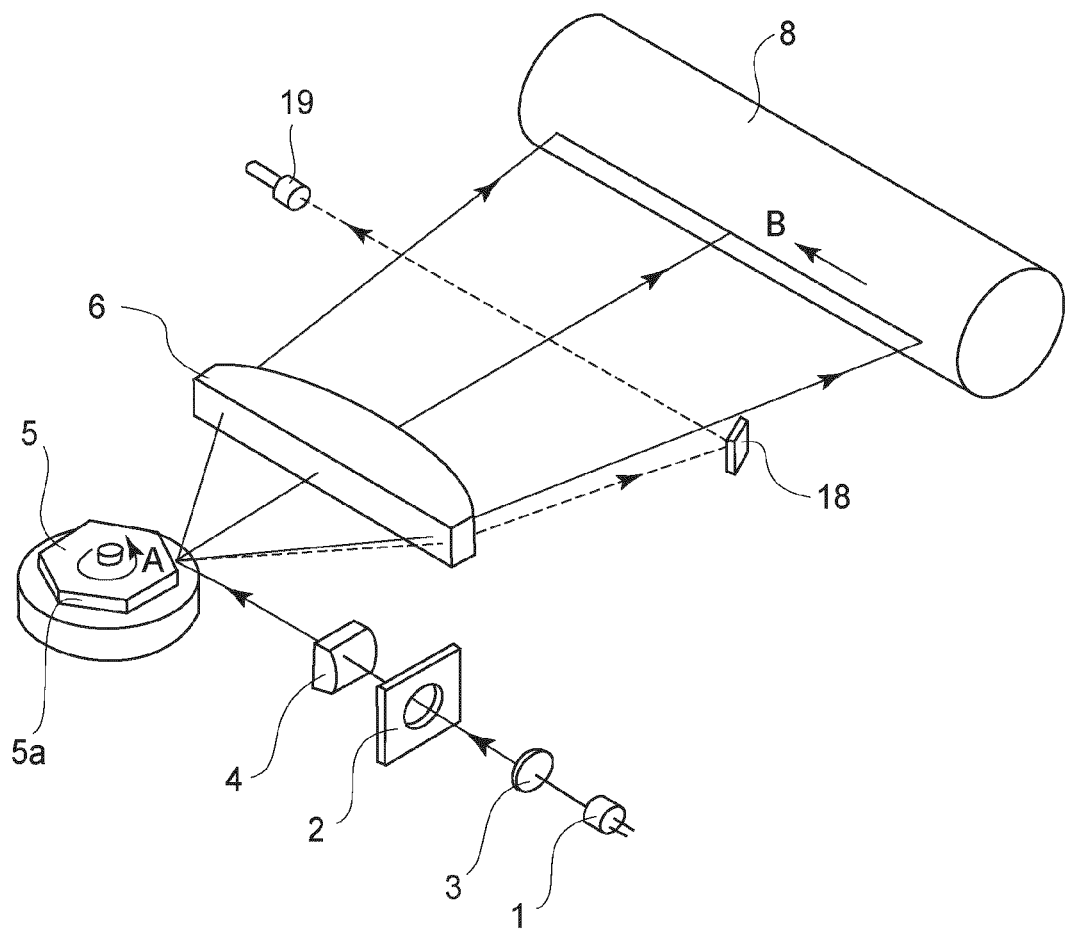
FIG. 19 is a perspective view of a main portion of a conventional optical scanning device.
Figure 20:
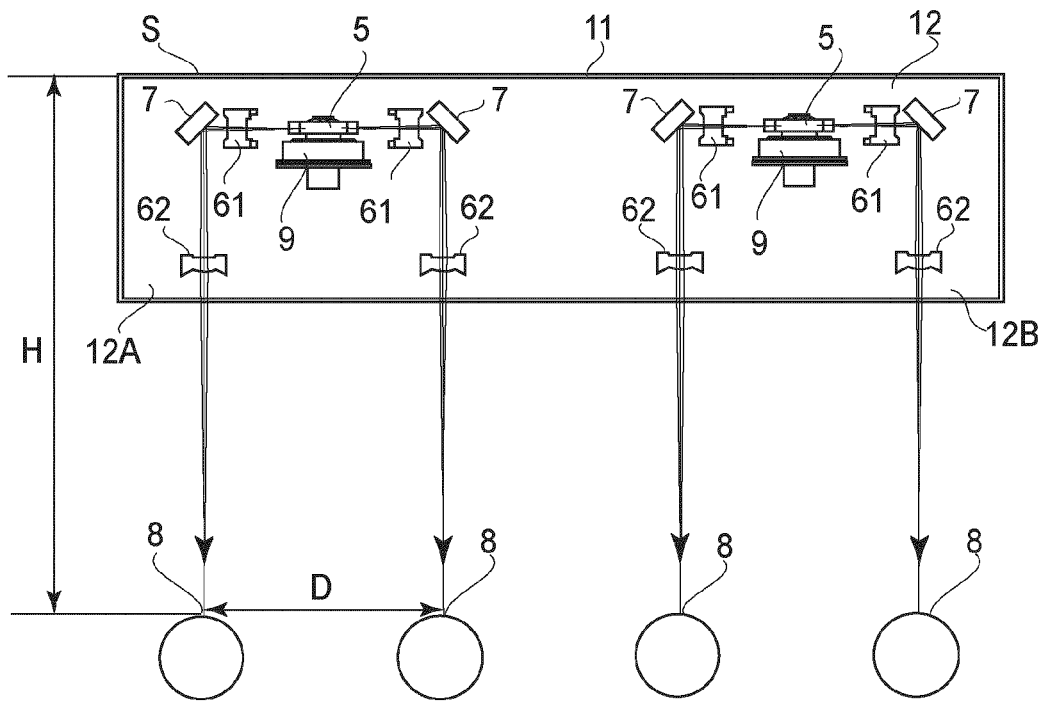
FIG. 20 is a sub-scan sectional view of a conventional optical scanning device.

FIG. 18 is a sectional view in the sub-scan direction of a main portion of a color image forming apparatus according to an embodiment of the present invention.

In the drawing, the sign 100 denotes the color image forming apparatus. A coded data Dc as a color signal is inputted into this color image forming apparatus 100 from external equipment 102 such as a personal computer.

This coded data Dc is converted into color imagewise data of Yi (yellow), Mi (magenta), Ci (cyan) and Bki (black) by means of a print controller 101 inside the device, and these are applied to the optical scanning device 12 having a structure as described with reference to the second embodiment.

Subsequently, a light beam having been modulated in accordance with the imagewise data Yi, Mi, Ci and Bki is outputted from this optical scanning device 12, by which beam the photosensitive surfaces of photosensitive drums 21-24 are scanned in the main-scan direction.

The photosensitive drums 21-24 as an electrostatic latent image bearing member (photosensitive member) are rotated clockwise (direction R) by a motor (not shown).

Then, with this rotation, the photosensitive surfaces of the photosensitive drums 21-24 move relative to the light beam, in the sub-scan direction orthogonal to the main-scan direction.

Disposed above the photosensitive drums 21-24 is a charging roller (not shown) for uniformly charging the surfaces of the photosensitive drums 21-24, the charging roller being disposed in contact with the drum surfaces.

The light beam scanningly deflected by the optical scanning device 21 having been described above is projected on the surfaces of the photosensitive drums 21-24 being electrically charged by the charging roller.

As has been described above, the light beam has been modulated based on the imagewise data Yi, Mi, Ci and Bki and, by irradiating the drums with the light beam, an electrostatic latent image is formed on the surface of each photosensitive drum 21-24.

This electrostatic latent image is developed into a toner image by means of developing devices 31-34 which are disposed in contact with the photosensitive drums 21-24 at a downstream side of the light beam irradiation position, with respect to the rotational direction of the photosensitive drum 21-24.

The four-color toner images developed by the developing devices 31-34 are once transferred to an intermediate transfer belt 103 which is disposed above the photosensitive drums 21-24 and arranged to be opposed to the photosensitive drums 21-24, whereby a color image is produced.

Then, the color toner image formed on the intermediate transfer belt 103 is transferred to a paper sheet 108 (transfer material) by means of transfer rollers 104. The paper sheet 108 is accommodated in a paper cassette 107.

The paper sheet 108 having an unfixed toner image transported thereto is conveyed to a fixing device. The fixing device is comprised of a fixing roller 105 having a fixing heater (not shown) mounted therein and a pressure roller 106 disposed to press-contact with the fixing roller 105.

The paper sheet 108 coming from the transfer station is heated while being pressed at the pressing station between the fixing roller 105 and the pressing roller 106, whereby the unfixed toner image on the paper sheet 108 is fixed thereon.

The paper sheet thus fixed is discharged out of the image forming apparatus.

Denoted at 109 is a registration sensor which functions to detect the amount of color misregistration of each color, by reading Y, M, C and Bk registration marks formed on the intermediate transfer belt 103.

The detection result is fed back to the optical scanning device 12, and formation of high-quality color image free from color misregistration is accomplished.

Although it is not shown in FIG. 18, the printer controller 101 is arranged not only to perform the data conversion explained hereinbefore but also to control inside components of the image forming apparatus as well as a polygon motor of the optical scanning device, for example.

While the invention has been described with reference to the structures disclosed herein, it is not confined to the details set forth and this application is intended to cover such modifications or changes as may come within the purposes of the improvements or the scope of the following claims.

This application claims priority from Japanese Patent Application No. 2007-144748 filed May 31, 2007, for which is hereby incorporated by reference.

What is claimed is:

1. An optical scanning device, comprising:
   at least two light source devices;
   a deflecting device having a plurality of deflecting surfaces;
   an input optical system configured to direct at least two light beams emitted from said at least two light source devices, onto different deflecting surfaces of said deflecting device; and
   a plurality of imaging optical systems configured to image the at least two light beams scanningly deflected by the different deflecting surfaces of said deflecting device, upon corresponding scan surfaces to be scanned, respectively;
   wherein the scan surfaces are simultaneously scanned by said deflecting device;
   wherein each of said plurality of imaging optical systems includes at least one transmission type imaging optical element and at least one reflection optical element,
   wherein each of the at least two light beams scanningly deflected by the different deflecting surfaces of said deflecting device passes through the at least one transmission type imaging optical element constituting said imaging optical system and is thereafter reflected by the at least one reflection optical element and, subsequently, it passes again through the transmission type imaging optical element, and
   wherein, after passing again through the transmission type imaging optical element, the at least two light beams scanningly deflected by the different deflection surfaces of said deflecting means intersect with each other within a sub-scan section.

2. An optical scanning device according to claim 1, wherein, when in the sub-scan section an angle defined between a principal ray of the light beam after first passing through the transmission type imaging optical element and a principal ray of the light beam after being reflected by the at least one reflection optical element but before passing again through the transmission type imaging optical element is denoted by $\psi$ (deg), a condition $$4° < \psi < 20°$$

is satisfied.

3. An optical scanning device according to claim 1, wherein, when a spacing defined within the sub-scan section between a deflecting point as the light beam emitted from said light source device is scanningly deflected by a deflecting surface of said deflecting means and a reflection point on the or one of the reflection optical elements by which the light beam scanningly deflected by said deflecting device is first reflected, is denoted by T (mm), and a spacing defined within the sub-scan section between incidence points of light beams on two adjacent scan surfaces is denoted by D (mm), a condition $$0.35 < T/D < 0.75$$

is satisfied.

4. An optical scanning device according to claim 1, wherein each of said imaging optical systems has only one transmission type imaging optical element.

5. An optical scanning device according to claim 1, wherein within the sub-scan section the principal ray of the light beam incident on the deflecting surface of said deflecting means is incident perpendicularly to the deflecting surface of said deflecting means.

6. An optical scanning device according to claim 1, wherein the or each reflection optical element constituting said imaging optical system comprises a plane mirror.

7. An image forming apparatus, comprising:
 an optical scanning device as recited in claim 1;
 a plurality of photosensitive members disposed at the scan surfaces, respectively;
 a plurality of developing devices each being configured to develop an electrostatic latent image formed on a corresponding photosensitive member with a light beam scanningly deflected by said optical scanning device, to produce a toner image;
 a plurality of transferring devices each being configured to transfer a developed toner image onto a transfer material; and
 a fixing device configured to fix the transferred toner image, on the transfer material.

8. An image forming apparatus according to claim 7, further comprising a printer controller configured to convert a color signal supplied from an outside machine into an image-wise data of different colors.

* * * * *